United States Patent
Sercinoglu et al.

(10) Patent No.: US 9,262,767 B2
(45) Date of Patent: *Feb. 16, 2016

(54) SYSTEMS AND METHODS FOR GENERATING STATISTICS FROM SEARCH ENGINE QUERY LOGS

(75) Inventors: Olcan Sercinoglu, Mountain View, CA (US); Artem Boytsov, San Francisco, CA (US); Jeffrey A. Dean, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 276 days.

This patent is subject to a terminal disclaimer.

(21) Appl. No.: 13/396,511

(22) Filed: Feb. 14, 2012

(65) Prior Publication Data

US 2012/0215765 A1 Aug. 23, 2012

Related U.S. Application Data

(63) Continuation of application No. 11/746,049, filed on May 8, 2007, now Pat. No. 8,126,874.

(60) Provisional application No. 60/746,886, filed on May 9, 2006.

(51) Int. Cl.
*G06F 7/00* (2006.01)
*G06F 17/30* (2006.01)
*G06Q 30/02* (2012.01)

(52) U.S. Cl.
CPC .......... *G06Q 30/02* (2013.01); *G06F 17/30395* (2013.01); *G06F 17/30693* (2013.01); *G06F 17/30864* (2013.01)

(58) Field of Classification Search
CPC .............. G06F 17/30864; G06F 17/30693; G06F 17/30395; G06F 17/30554; G06F 17/30592; G06F 17/30536; G06F 17/30595; G06F 17/30463; Y10S 707/99935; Y10S 707/99934; Y10S 707/99945; Y10S 707/99944; Y10S 707/99943; Y10S 707/99942; H04J 1/10
USPC ................................................... 707/721, 769
See application file for complete search history.

(56) References Cited

U.S. PATENT DOCUMENTS

| | | | | |
|---|---|---|---|---|
| 5,613,113 | A | * | 3/1997 | Goldring ............................... 1/1 |
| 5,625,815 | A | * | 4/1997 | Maier et al. ........................... 1/1 |
| 5,696,964 | A | | 12/1997 | Cox et al. |
| 5,983,216 | A | * | 11/1999 | Kirsch et al. ......................... 1/1 |
| 6,067,541 | A | | 5/2000 | Raju et al. |
| 6,108,648 | A | | 8/2000 | Lakshmi et al. |

(Continued)

OTHER PUBLICATIONS

Hilbert et al. "Extracting Usability Information from User Interface Events". ACM 2000.*

(Continued)

*Primary Examiner* — Daniel Kuddus

(57) ABSTRACT

A computer-implemented method includes calculating first statistics about a user-identified event within a first subset of a database of events; selecting a second subset of the database of events based on said first statistics; calculating second statistics about the user-identified event within the second subset of the database of events; merging the first and second statistics as statistics of the user-identified event within the entire database of events; and generating a result including at least a portion of the merged statistics of the user-identified event.

24 Claims, 15 Drawing Sheets

(56) References Cited

U.S. PATENT DOCUMENTS

| | | | |
|---|---|---|---|
| 6,115,393 A * | 9/2000 | Engel et al. | 370/469 |
| 6,144,967 A | 11/2000 | Nock | |
| 6,278,993 B1 | 8/2001 | Kumar et al. | |
| 6,292,830 B1 | 9/2001 | Taylor et al. | |
| 6,477,523 B1 | 11/2002 | Chiang | |
| 6,687,696 B2 * | 2/2004 | Hofmann et al. | 1/1 |
| 6,766,320 B1 * | 7/2004 | Wang et al. | 1/1 |
| 6,898,597 B1 * | 5/2005 | Cook et al. | 1/1 |
| 6,947,927 B2 * | 9/2005 | Chaudhuri et al. | 1/1 |
| 7,240,049 B2 * | 7/2007 | Kapur | 1/1 |
| 7,308,643 B1 * | 12/2007 | Zhu et al. | 715/206 |
| 7,363,289 B2 * | 4/2008 | Chaudhuri et al. | 1/1 |
| 7,383,262 B2 * | 6/2008 | Das et al. | 1/1 |
| 7,426,507 B1 * | 9/2008 | Patterson | 1/1 |
| 7,567,959 B2 * | 7/2009 | Patterson | 1/1 |
| 7,580,921 B2 * | 8/2009 | Patterson | 1/1 |
| 7,584,175 B2 * | 9/2009 | Patterson | 1/1 |
| 7,603,345 B2 * | 10/2009 | Patterson | 1/1 |
| 7,617,201 B1 * | 11/2009 | Bedell et al. | 1/1 |
| 7,668,823 B2 * | 2/2010 | Oldham et al. | 707/723 |
| 2001/0049674 A1 | 12/2001 | Talib et al. | |
| 2002/0152305 A1 * | 10/2002 | Jackson et al. | 709/224 |
| 2003/0182276 A1 * | 9/2003 | Bossman et al. | 707/3 |
| 2003/0217033 A1 * | 11/2003 | Sandler et al. | 707/1 |
| 2004/0064831 A1 * | 4/2004 | Abbott et al. | 725/1 |
| 2004/0215607 A1 * | 10/2004 | Travis, Jr. | 707/3 |
| 2004/0230461 A1 * | 11/2004 | Talib et al. | 705/7 |
| 2005/0010564 A1 * | 1/2005 | Metzger et al. | 707/3 |
| 2006/0074883 A1 * | 4/2006 | Teevan et al. | 707/3 |
| 2006/0253491 A1 * | 11/2006 | Gokturk et al. | 707/104.1 |
| 2007/0038889 A1 * | 2/2007 | Wiggins et al. | 714/20 |

OTHER PUBLICATIONS

Dinur et al., "Revealing Information while Preserving Privacy", ACM, 2003.*

Srivastava et al. "Web Usage Mining: Discovery and Applications of Usage Patterns from Web Data". SIGKDD, 2000.*

Wang et al., Instance-based Schema Matching for Web Databases by Domain-specific Query Probing, VLDB conference, 2004.*

Gang et al., "Toward a Progress Indicator for Database Queries"; ACM 2004.*

Muthuswamy et al., "A Detailed Statistical Model for Relational Query Optimization"; ACM 1985.*

Wang et al., "Minining Longitudinal Web Queries: Trends and Patterns"; Journal of American Society for Information Science and Technology; 2003.*

Srivastava et al. "Web Usage Mining: Discovery and Applications of Usage Patterns from Web Data": Publisher : ACM SIGKDD Exploration Newsletter, Jan. 2000.*

Sercinoglu, et al., International Search Report and Written Opinion for International Application No. PCT/US07/68602, mailed Jul. 18, 2008, 10 pages.

* cited by examiner

US 9,262,767 B2

SYSTEMS AND METHODS FOR GENERATING STATISTICS FROM SEARCH ENGINE QUERY LOGS

RELATED APPLICATION

This application is a continuation of U.S. application Ser. No. 11/746,049, filed May 8, 2007 now U.S. Pat. No. 8,126,874, which claims priority to U.S. Provisional Application Ser. No. 60/746,886, filed May 9, 2006, which is incorporated herein by reference in its entirety.

FIELD OF THE INVENTION

The present invention relates generally to search engine and in particular to systems and methods for generating statistics from search engine query logs.

BACKGROUND OF THE INVENTION

Data aggregation is a process in which information is gathered and expressed in a summary form for purposes such as statistical data analysis. It often reveals useful information hidden in a large volume of original data records. For example, from a database containing millions of sales records generated by an on-line store, a marketing analyst can learn information about a particular group of consumers such as trends and patterns in their shopping habits by aggregating the related sales records based on specific variables such as product type information, product pricing information, customer age, customer gender, geographic location (e.g., store location or purchaser's address) and any other customer and/or product information available in the database.

As another example, a web search engine may receive millions of queries per day from users around the world. For each query, the search engine generates a query record in its query log. The query record may include one or more query terms, a timestamp indicating when the query is received by the search engine, an IP address identifying a unique device (e.g., a PC or a cell phone) from which the query terms are submitted, and an identifier associated with a user who submits the query terms (e.g., a user identifier in a web browser cookie; in some cases the user identifier may also be associated with a toolbar or other application or service to which the user has subscribed). Appropriate aggregation of these query records can also unveil interesting or useful information about the web search engine users. For instance, a publisher can gauge the popularity of a newly released book in a specific city from the frequencies of relevant queries submitted by users from that city within a given time period.

For the same query log, social scientists, marketers, and politicians may have dramatically different interests and therefore require different types of data aggregations to meet their needs. Some types of "data mining" of a search engine's log records may be useful only if the statistical inquiries receive substantially instantaneous responses (e.g., in less than five seconds). But most of the conventional data aggregation techniques are incapable of deriving reliable statistical information from a large number of query records substantially instantaneously.

Another concern with data mining search engine query logs or commercial transaction logs is the protection of user privacy. Even if the log records do not contain user names or the like, returning statistical information or trends information based on very small numbers of users or transactions (e.g., less than twenty transactions) may inadvertently disclose information that can be traced back to an individuals or small groups of users (e.g., fewer than a predefined number of distinct users, such as twenty, one hundred or two hundred distinct users). It is therefore important that any log record data mining tool include safeguards for preventing the disclosure of information that may be traced back to individuals or small groups of users.

SUMMARY

In a first aspect of the present invention, a computer-implemented method comprises calculating first statistics about a user-identified event within a first subset of a database of events; selecting a second subset of the database of events based on said first statistics; calculating second statistics about the user-identified event within the second subset of the database of events; merging the first and second statistics as statistics of the user-identified event within the entire database of events; and generating a result including at least a portion of the merged statistics of the user-identified event.

In a second aspect of the present invention, a computer-implemented method comprises identifying in an inverse index file a sequence of positions associated with an indexed item, wherein the sequence of positions corresponds to a set of events from a sequence of randomly-arranged events, each event including at least one occurrence of the indexed item and having a respective sequence number; selecting in the sequence of randomly-arranged events an event corresponding to a predefined position in the sequence of positions and its sequence number; determining a number of positions in the sequence of positions that precede the predefined position; and determining an occurrence frequency for the indexed item in the sequence of randomly-arranged events using the selected event's sequence number and the determined number of positions.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

Like reference numerals refer to corresponding parts throughout the several views of the drawings.

DESCRIPTION OF EMBODIMENTS

Figure 1:
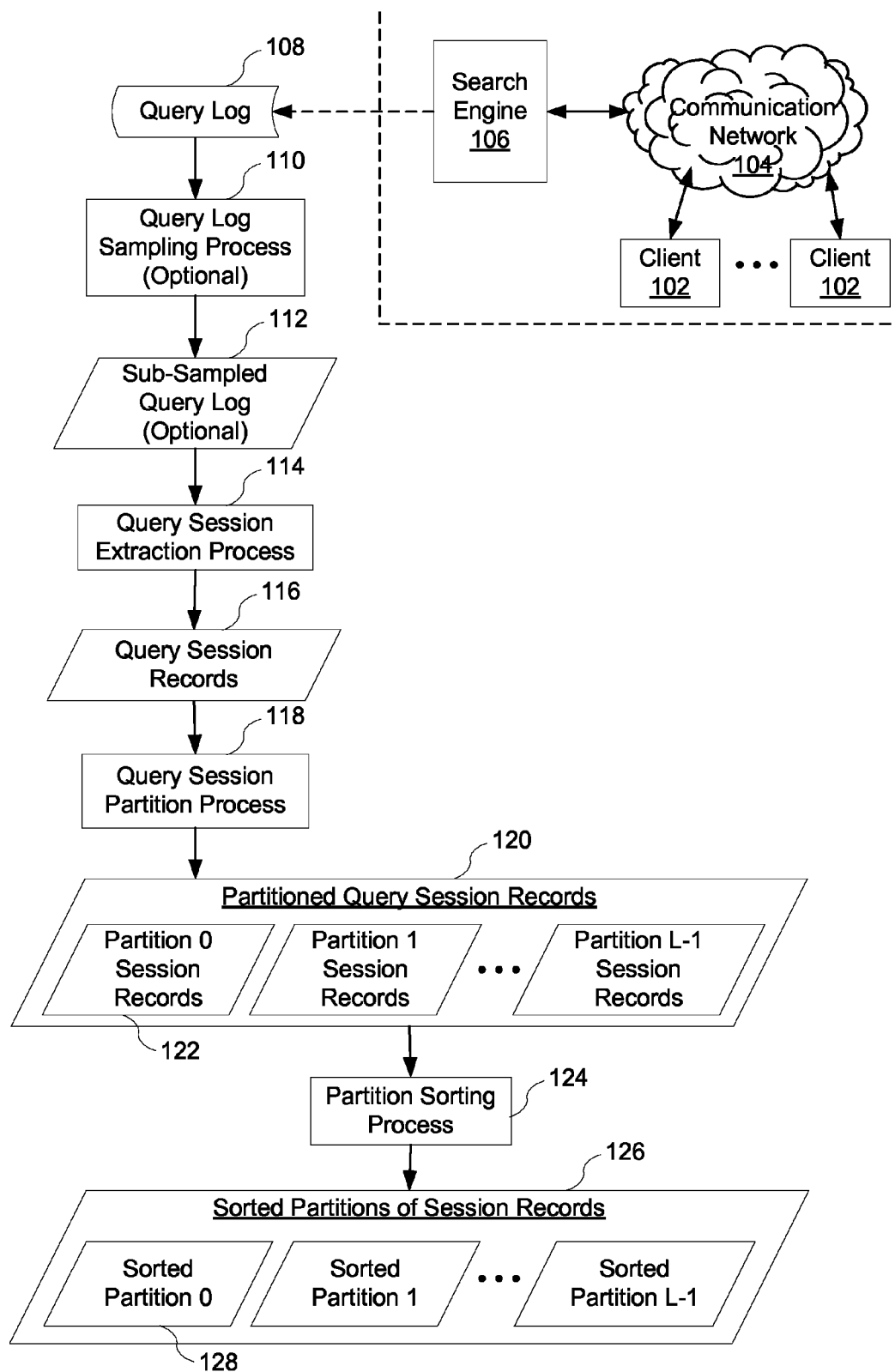
FIG. 1 is a flowchart illustrating a process of converting a query log into multiple sorted partitions of session records in accordance with some embodiments of the present invention.
Figure 2A:
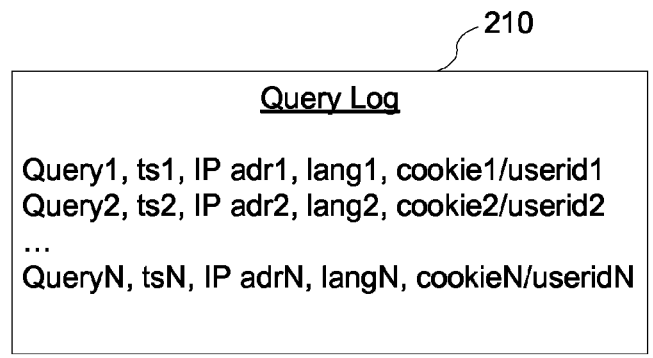
FIG. 2A is a block diagram of a data structure for storing a query log in accordance with some embodiments of the present invention.

In order to generate statistics from a large database efficiently, some data pre-processing operations may be necessary. FIG. 1 is a flowchart illustrating such a data pre-processing procedure for converting a web search engine's query log into multiple sorted partitions of session records. Many users submit queries from clients 102 to a search engine 106 through a communication network 106 (e.g., the Internet). For each query, the search engine 106 generates a query record in a query log file 108. As shown in FIG. 2A, a query log 210 contains many query records. Each query record has multiple attributes, including one or more query terms of a search query, a timestamp, an IP address, and a web cookie or other user identifier. In some embodiments, each query record includes a language identifier, identifying the language associated with the search query. The timestamp indicates when the search query is received by the search engine, and the IP address maps to a unique device (e.g., a personal computer, cell phone, or other client device) from which the search query terms are submitted. In some embodiments, the web cookie uniquely identifies a user of the web search engine and therefore can be used as a proxy for the user's identifier. Alternately, each query log record contains a user identifier.

To get reliable statistical information from the query log 108, it is not always necessary to survey all the query records (also herein called log records or transaction records) in the query log. As long as the statistical information is derived from a sufficient number of samples in the query log, the information is as reliable as information derived from all the log records. Moreover, it takes less time and computer resources to survey a sub-sampled query log. Therefore, a query log sampling process 110 can be employed to sub-sample the query log 108 and produce a sub-sampled query log 112. For example, the sub-sampled query log 112 may contain ten percent or twenty percent of the log records in the original query log 108. Note that the sampling process is optional. In some embodiments, the entire query log 108 is used to generate statistical information.

The query log sampling process 110 may utilize any of a number of different random (or pseudo-random) sampling schemes to produce a sub-sampled, but diversified and robust, query log 112. In some embodiments, the query log sampling process 110 performs a uniform sub-sampling of the query log, e.g., selecting every fifth query record as the sub-sampled query log. In some other embodiments, the query log sampling process 110 first separates all the query records by their associated geographical regions (which are based on the IP addresses associated with the records). For each geographical region, the query log sampling process 110 randomly selects a certain percentage of query records as the sub-sampled query log. This sampling scheme ensures that query records from different geographical regions are proportionally included in the sub-sampled query log, based on their ratios in the original query log. These sub-sampling schemes can be based other predefined criteria. There are also many other sampling schemes known to one skilled in the art that may be used here to produce the sub-sampled query log 112.

In some embodiments, the query log sampling process 110 implements a sampling strategy to achieve a sub-sampled query log 112 that satisfies one or more predefined diversity requirements. Exemplary requirements include limiting the number of query records in the query log 112 having a particular IP address for a given time period. These requirements can effectively increase the sub-sampled query log 112's diversity and prevent the sub-sampled query log 112 from being corrupted by bogus query data associated with malicious operations such as query spam.

Very often, a user may submit multiple related queries to the search engine 106 within a short timeframe in order to find information of interest. For example, the user may first submit a query "French restaurant, Palo Alto, Calif.", looking for information about French restaurants in Palo Alto, Calif. Subsequently, the same user may submit a new query "Italian restaurant, Palo Alto, Calif.", looking for information about Italian restaurants in Palo Alto, Calif. These two queries are logically related since they both concern a search for restaurants in Palo Alto, Calif. This relationship may be demonstrated by the fact that the two queries are submitted closely in time or the two queries share some query terms (e.g., "restaurant" and "Palo Alto").

In some embodiments, these related queries are grouped together into a query session to characterize a user's search activities more accurately. A query session is comprised of a one or more queries from a single user, including either all queries submitted over a short period of time (e.g., ten minutes), or a sequence of queries having overlapping or shared query terms that may extend over a somewhat longer period of time (e.g., queries submitted by a single user over a period of up to two hours). Queries that concerning different topics or interests are assigned to different sessions, unless the queries are submitted in very close succession and are not otherwise assigned to a session that includes other similar queries.

The same user looking for Palo Alto restaurants may submit a query "iPod Video" later for information about the new product made by Apple Computer. This new query is related to a different interest or topic that Palo Alto restaurants, and is therefore not grouped into the same session as the restaurant-related queries. Therefore the queries from a single user may be associated with multiple sessions. Two sessions associated with the same user will share the same cookie, but will have different session identifiers.

Figure 2B:
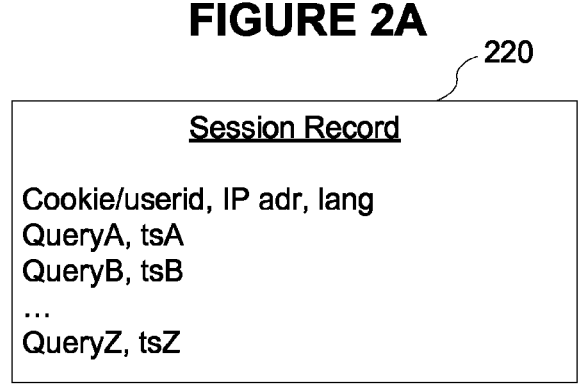
FIG. 2B is a block diagram of a data structure for storing a query session record in accordance with some embodiments of the present invention.

As shown in FIG. 1, a query session extraction process 114 is invoked to classify the individual query records into different query session records 116. A query session record includes queries closely spaced in time and/or queries that are related to the same user interest. In some embodiments, the query session extraction process is based on heuristics. For example, consecutive queries belong to the same session if they share some query terms or if they are submitted within a predefined time period (e.g., ten minutes) even though there is no common query term among them. FIG. 2B depicts one data structure 220 for storing a session record. Since the query records with the session record belong to the same user, they must have the same cookie, which is used here as a proxy for the user's identifier, as well as the same IP address. Each query record includes one or more query terms and a timestamp. In some embodiments, a query record 220 also includes a language identifier.

Figure 2C:
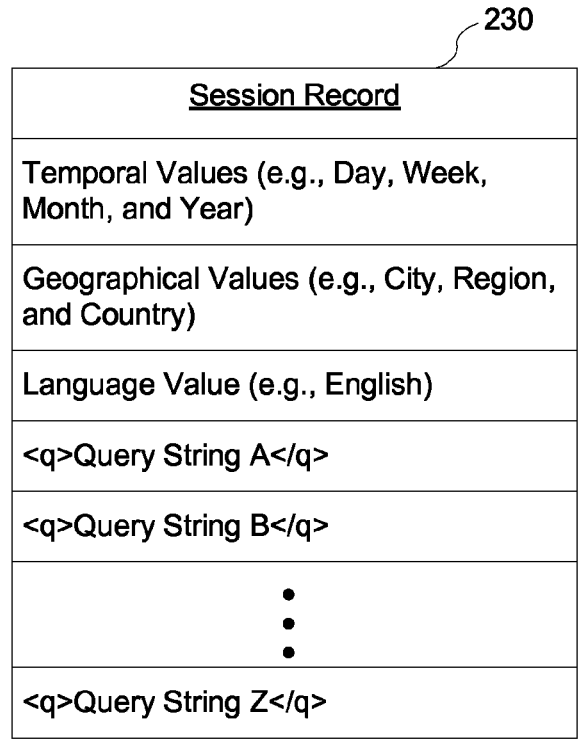
FIG. 2C is a block diagram of an alternative data structure for storing the query session record in accordance with some embodiments of the present invention.

FIG. 2C illustrates an alternative data structure 230 for storing the session record. In this embodiment, the timestamps associated with the query records in the session record are translated into certain temporal values (e.g., day, week, month, and year) and the IP addresses are converted into certain geographical values (e.g., city, region, and country). The query record 230 may also include a language value (e.g., English, French, Spanish, etc.). In some embodiments, the temporal values are represented in the form of absolute values that represent the interval from a predefined moment in the history, e.g., Jan. 1, 2000, to the time represented by the query record's timestamp. For example, the month value "75" corresponds to March, 2006. This absolute expression is convenient for data aggregation operations, and facilitates the aggregation of information from session records for particular days, weeks, months or years. In some embodiments, the temporal values for each session record are determined in accordance with the timestamp for the first query in the session. In other embodiments the timestamp of the last query in the session or an average of the timestamps in the session are used to determine the temporal values.

In some embodiments, a temporal or geographical value also includes a corresponding parameter name, and thus is represented as a name-value pair. For example, the city value of a session record is expressed as "CITY=London" and the year value is expressed as "YEAR=2005". This type of expression can be easily distinguishable from regular query terms like "London" or "2005". As will be explained below, this name plus value expression corresponds to a single token in the lexicon of the log records database and the token is different from the tokens corresponding to the query terms "London" and "2005". Therefore, the database of logs records can be searched for instances of a single token in order to identify session records having a particular temporal parameter value or a particular geographic parameter value.

Another characteristic of the session record data structure 230 is that each of the queries in the session record is separated from the others by a query boundary marker, such as <q>. In this way, a set of session records can be searched either (A) for all sessions that contain a user-specified Boolean combination of query terms (e.g., "Paris" and "restaurants"), or (B) for all sessions that contain at least one query that contains a user-specified Boolean combination of query terms. The first exemplary request ignores the query boundary markers in the session records, while the second request only matches sessions that have query terms, not separated by any query boundary markers, which satisfy the user-specified Boolean combination of query terms.

In most cases, the number of query session records 116 is too large to be processed by a single computer server efficiently. Accordingly, a query session partition process 118 (FIG. 1) is employed to divide the query session records into many database partitions 120, each database partition corresponding to a portion of the session records. In some embodiments, the query session records 116 are divided or distributed into L partitions 122. Each partition of session records is assigned to a respective computer server. Each partition 12 includes a non-overlapping subset of the query session records 116. In some embodiments, the session records constituting the partition are randomly chosen from the query session records 116 by the query session partition process 118. Alternately, the users identified in the query log entries are randomly assigned to the L partitions, and then all the query session records of the users are distributed to the partitions to which the corresponding users have been assigned.

In some embodiments, the data aggregation occurs at the query session record level. For example, in order to compute the percentage of query sessions containing the query term "iPod" among all query sessions associated with the city of London, a computer server only needs to check the inverse index to determine a first number of session records containing both the term "iPod" and the term "CITY=London" and a second number of session records containing the term "CITY=London". Dividing the first total number by the second total number gives the percentage of the query sessions from London that contain the term "iPod". It may be noted that this percentage may be somewhat different from the percentage of users from London who have submitted at least one query having the term "iPod".

The reason is because one London user may be associated with multiple query sessions including the term "iPod". As noted above, the query session extraction process 114 is a heuristic procedure. It does not guarantee that all the queries corresponding to one user interest always fall into the same session. For example, the user may submit one iPod-related query in Day One followed by some other queries unrelated to iPods, and then another iPod-related query in Day Two. In this case, the two iPod-related queries will be assigned to two different query sessions, and the aforementioned approach of calculating the query session-based percentage would count both query sessions.

In order to compute a user-based percentage, as opposed to a query session-based percentage, a partition sorting process 124 is required. The partition sorting process 124 sorts the query sessions within a database partition by users. As a result, each partition 122 of session records in the database 120 becomes a sorted partition 128 in the database 126. The query sessions associated with one particular user are grouped together as one contiguous set. Different sets associated with different users are arranged in a random order such that any portion of the sorted partition does not have any biased data distribution. Similarly, the query sessions associated with each respective user are also arranged in a random order for similar purposes. But since one user may have multiple query sessions matching the query term "iPod", having a total number of matching sessions from the inverse index is not enough to calculate the percentage of users who have submitted queries that include the term "iPod." Rather, it is necessary to access all the query session records in a sorted database partition 128 to avoid counting more than once for those users having more than one matching query session record. Although this percentage estimate is more computationally expensive, it is clearly a more accurate indication of a query term's popularity among users of the search engine. A more detailed description of the sorted session records within a partition is provided below in connection with FIG. 4A.

Figure 3:
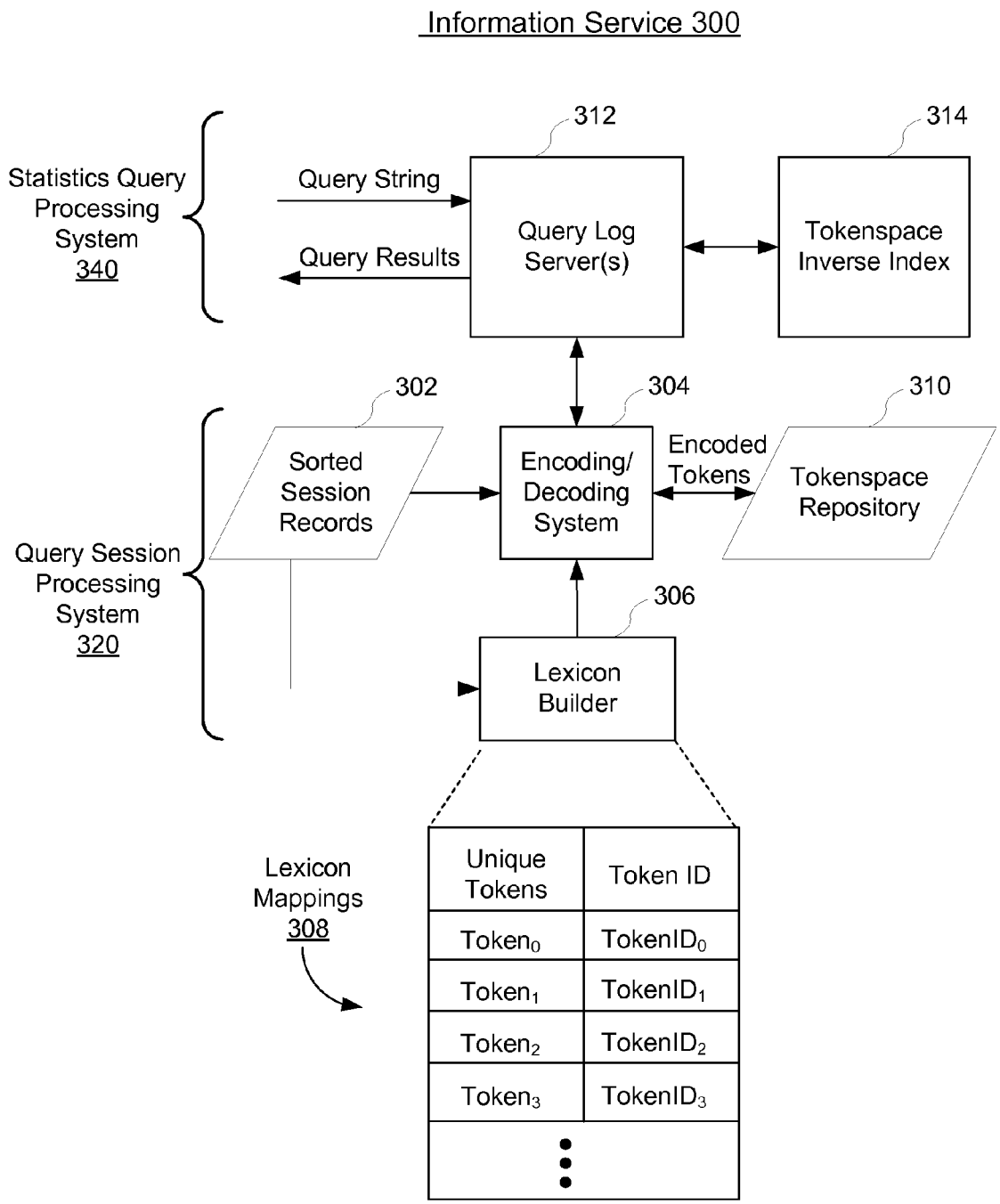
FIG. 3 is a block diagram of an exemplary information service that generates statistics in response to a query in accordance with some embodiments of the present invention.

FIG. 3 is a block diagram of an exemplary information service 300. The information service 300 generates statistics about one or more query terms in response to a query string containing the query terms. The information service 300 includes a query session processing system 320 and a statistics query processing system 340.

The query session processing system 320 generally includes one or more database partitions 302 of sorted session records, a lexicon builder 306, an encoding/decoding system 304 and a tokenspace repository 310 containing tokenized session records. The encoding/decoding system 304 retrieves session records from the one or more database partitions 302, parses the session records into tokens, encodes the tokens into a compressed format using the lexicon mappings 308 from the lexicon builder 306, and then stores the encoded tokens into the tokenspace repository 310. The lexicon builder 306 generates the lexicon mappings 308 used for encoding a set of query session records by parsing the query session records.

A "token" can be any object typically found in a query session record, including but not limited to terms, phrases, temporal values, geographical values, language value and the like. After parsing, a set of query session records is represented as a sequence of tokens. In some embodiments, every token has the same fixed size (e.g., 32 bits). Furthermore, each token in the sequence of tokens has a token position in the tokenspace repository 310. The token position of a token also represents the position of the token in the set of query session records. For example, the first token in the set of query session records may be assigned a position of 0, the second token in the set of query session records may be assigned a position of 1, and so on. It is noted that in some implementations, a completely different set of computer servers are used for encoding query session records than the computer servers used for decoding query session records.

The statistics query processing system 340 includes one or more query log servers 312 coupled to the encoding/decoding system 304 and a tokenspace inverse index 314. The tokenspace inverse index 314 maps all the tokenIDs in the set of query session records to their positions within the tokenspace repository 310 (which contains the query session records). Conceptually, the inverse index 314 contains a list of token positions for each tokenID. For efficiency, the list of token positions for each tokenID may be encoded so as to reduce the amount of space occupied by the inverse index 314.

In some embodiments, the query log servers 312 parse a statistics query into multiple query terms that are transformed by the query log servers 312 into a query expression (e.g., Boolean tree expression). A lookup operation is performed so as retrieve from the tokenspace inverse index 314 the token positions in the tokenspace repository 310 of the query terms, as described below in connection with FIG. 5A. The query log servers 312 use the token positions to retrieve relevant tokenized query session records from the tokenspace repository 310, perform data aggregation operations on the retrieved query session records, and return statistical information based on the data aggregation operations as the query result.

Figure 4A:
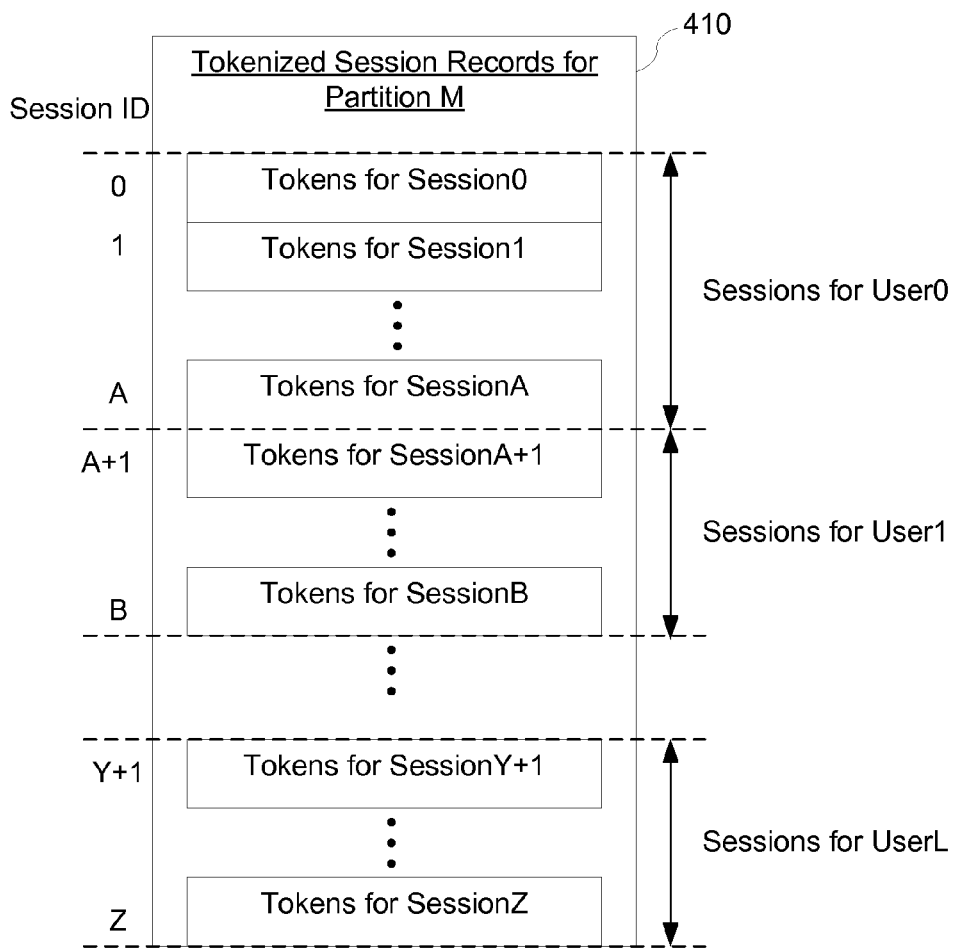
FIG. 4A is a block diagram of a data structure for storing tokenized session records within a database partition in accordance with some embodiments of the present invention.

As noted above, multiple query session records may correspond to the same user within a database partition and user-based statistical information is generally more preferable than query session-based statistical information. Accordingly, the query session records within a database partition are sorted by user to achieve better performance when aggregated. FIG. 4A depicts an exemplary data structure 410 for storing the tokenized query session records associated with different users within a database partition M, each query session record having a unique session ID (sometimes called a Doc ID). In some embodiments, integer numbers starting from zero are used as the session IDs. Therefore, the session ID of a particular session record also indicates the number of query session records preceding it in the database partition. The query session records are sorted by user such that the query session records associated with one user have continuous session IDs. For example, the first (A+1) query session records correspond to a first user having a unique ID "User0", the next (B−A) query session records correspond to a second user having an ID "User1", and the last (Z−Y) query session records correspond to the last user having an ID "UserL". In some embodiments, integer numbers starting from zero are also used for representing user IDs. Similarly, the user ID associated with a particular session record also indicates the number of users corresponding to the query sessions preceding the current one. As will be explained below, this naming convention makes it easier to normalize data aggregation results.

Figure 4B:
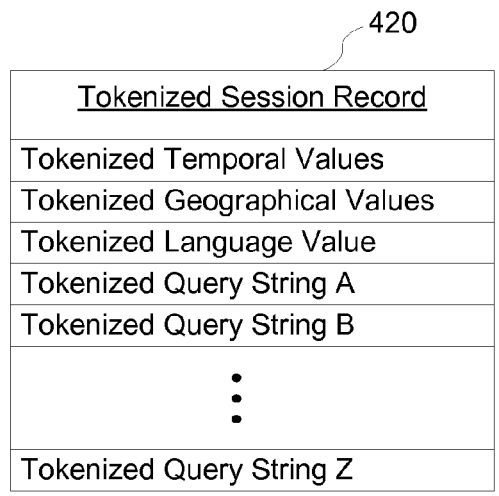
FIG. 4B is a block diagram of a data structure for storing a tokenized session record in accordance with some embodiments of the present invention.

FIG. 4B is a data structure 420 for storing an individual tokenized session record in the data structure 410 of FIG. 4A. This data structure has the same set of components as the data structure 230 of FIG. 2C except that every component in the data structure 230 has been encoded (tokenized) to occupy less space. When a repository position identified in the tokenspace inverse index 314 corresponds to a location within the data structure 420, the query log servers 312 retrieve the tokenized session record and aggregate its parameter values accordingly. For example, if the data aggregation is to calculate the total number of users from London and the tokenized geographical values of a respective session record include the tokenized version of "CITY=London", the counter corresponding to the total number will increase by one.

Figure 5A:
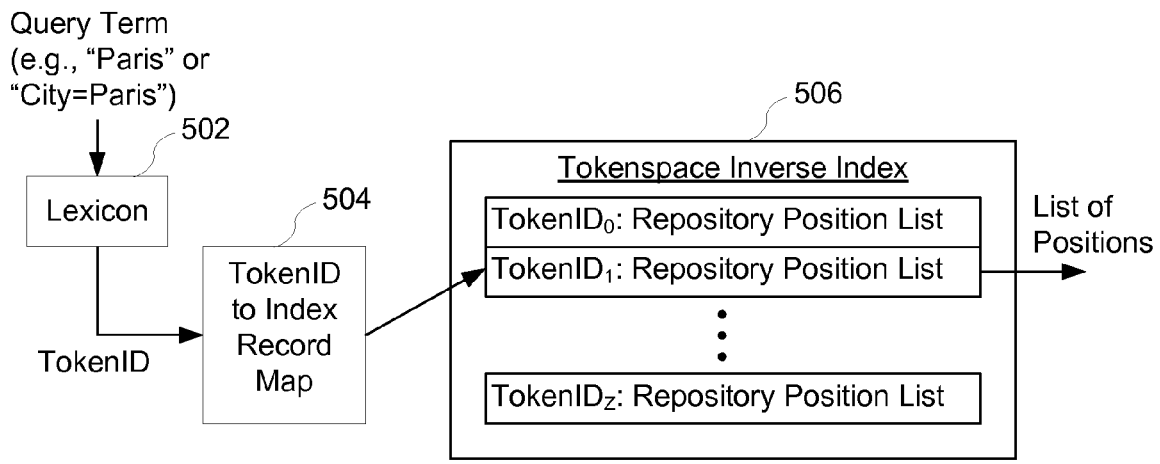
FIG. 5A is a flow diagram of a process of identifying a list of repository positions in response to one or more query terms in accordance with some embodiments of the present invention.
Figure 5B:
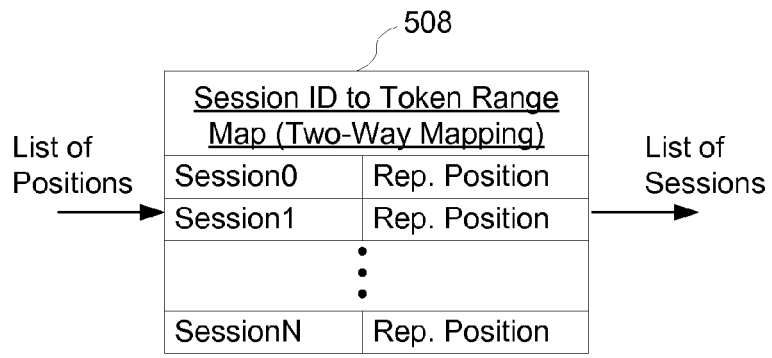
FIG. 5B is a block diagram of a data structure for translating or mapping repository positions to session record identifiers and vice versa in accordance with some embodiments of the present invention.
Figure 5C:
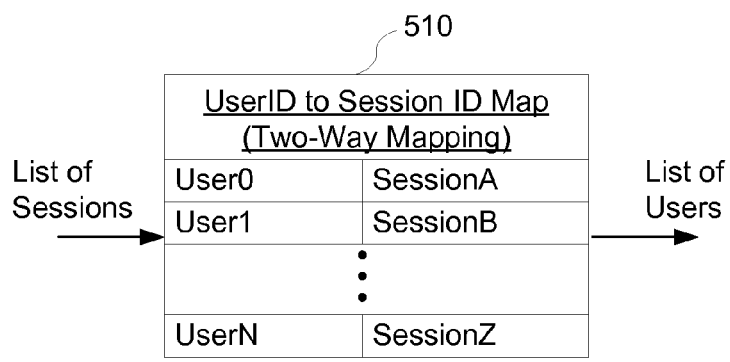
FIG. 5C is a block diagram of a data structure for translating or mapping session record identifiers to user identifiers and vice versa in accordance with some embodiments of the present invention.

As noted above, the tokenspace inverse index 314 contains the repository positions for different tokenIDs. But the typical goal of a statistics query is to find out the percentage of users submitting certain queries among a specific group of users meeting certain criteria. Some mapping mechanisms are necessary to bridge the gap between the domain of repository positions and that of users submitting queries. FIGS. 5A-5C are block diagrams illustrating an exemplary process of generating statistical information in response to a statistics query.

FIG. 5A is a block diagram of an embodiment of the first stage of the exemplary process with a tokenspace repository. The process involves a lexicon 502, a tokenspace inverse index 506, and a tokenID to index record map 504. Query terms or strings are received by the lexicon 502 that translates the query terms into tokenIDs using a translation table or mapping built from entries of the lexicon 502. A map 504 then maps the tokenIDs to index records stored in the inverse index 508. Each index record identified using the map 504 contains a list of token positions, which directly correspond to token positions in the tokenspace repository 310.

The token positions in the tokenspace inverse index 506 refer to the exact locations of the query terms in different tokenized query session records in the tokenspace repository 310. In order to aggregate the parameter values of each query session record containing one of the token positions, the query log servers 312 need to identify the starting position of the query session record in the tokenspace repository 310.

FIG. 5B is a data structure for storing a two-way look-up map 508 between the session IDs of the query session records in the tokenspace repository and the starting positions of the query session records in the repository. Each entry in the two-way look-up map 508 includes a session ID and a starting repository position for the corresponding query session record. The last token in any query session record is the position immediately prior to the starting position identified by the next entry in the look-up map 508.

Assuming that a repository position corresponding to the query term "iPod" is 113, a lookup of the map 508 indicates that this position value is greater than the starting position of SessionM and smaller than the starting position of SessionM+1. Therefore, the query session record SessionM must contain the query term "iPod". One of the query log servers 312 then visits the data structure 410 of FIG. 4A to retrieve the tokenized session record for SessionM and aggregates the parameter value of the retrieve session record.

FIG. 5C is a data structure for storing a two-way look-up map 510 between the user IDs and the starting session IDs of the corresponding users. Each entry in the two-way look-up map 510 includes a user ID and a starting session ID for the corresponding user. The session ID of the last session record of any user is the value immediately prior to the starting session ID of the next entry in the look-up map 510. For example, the starting session ID of the user "User0" in FIG. 4A is 0, the starting session ID of the user "User1" is A+1, and the starting session ID of the user "UserL" is Y+1.

If the goal is to generate user-based statistical information, after aggregating one session record associated with a particular user, a query log server must skip the remaining query sessions associated with the same user and move to the matching session record associated with the next user. Suppose that the list of repository positions matching the query term "iPod" identified in the inverse index 506 includes 113, 134, 153, and 178, and they are found in the query sessions M, M+2, M+6, and M+8, respectively. In other words, the first instance of the query term "iPod" is in the query session M, the second instance is in the session M+2, the third instance is in the query session M+6, and the forth instance is in the query session M+8. Further, suppose that the starting session IDs for users A and A+1 are M−2 and M+7, respectively. The query log server first aggregates the query session M. Since the ID of session M is larger than that of session M−2 and smaller than that of session M+7, session M belongs to user A. By the same token, both sessions M+2 and M+6 belong to user A. Therefore, after aggregating session M, the query log server skips the other two instances of the term "iPod" in the sessions M+2 and M+6 since they are associated with the same user A. The next query session visited by the query log server is the query session M+8, which belongs to a different user having a user ID "A+1". The user ID "A+1" also indicates the total number of users that have been scanned for the current data aggregation result. As will be explained below in connection with FIG. 8, this value can be used to normalize the data aggregation result.

As noted above, the sheer volume of the query session records is often beyond the capacity of a single computer server. Accordingly, the query session records are broken into multiple partitions, each partition being assigned to a respective query log server. In some embodiments, a small number of partitions, e.g., two, three or four, may be assigned to the same query log server. For purposes of explaining the operation of a statistics query processing system, each partition may be treated as a distinct entity executing on a distinct query log server.

Figure 6:
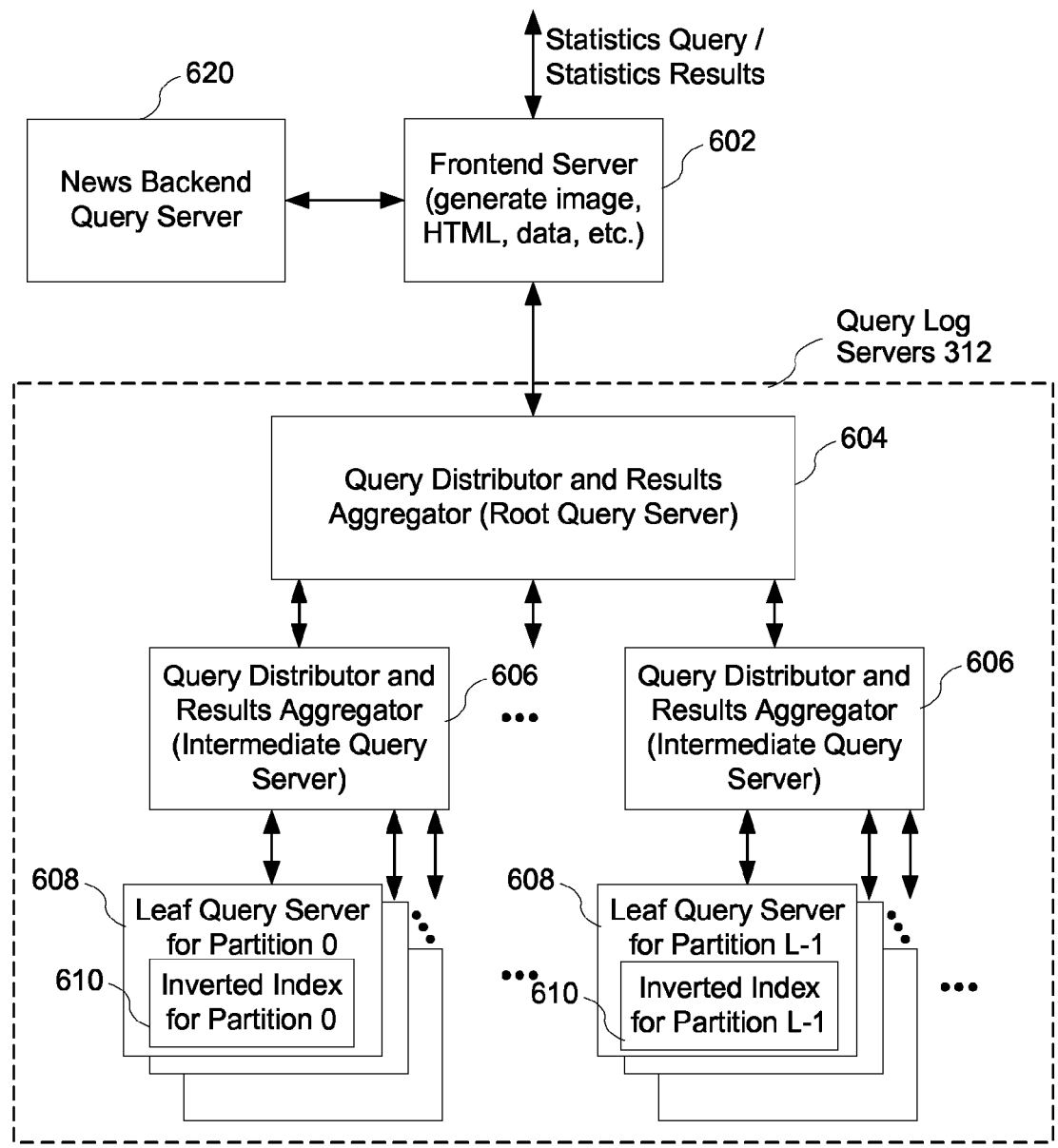
FIG. 6 is a block diagram of an exemplary hierarchical structure of multiple query servers in accordance with some embodiments of the present invention.

In order to increase the throughout of the statistical query processing system 340 of FIG. 3, the query log servers are arranged in a hierarchical structure (e.g., tree). FIG. 6 is a block diagram of such an exemplary hierarchical structure in accordance with some embodiments of the present invention. The query log servers 312 are coupled to a frontend server 602. The frontend server 602 is coupled to a news backend server 620. The news backend server 620 is responsible for generating news-related statistical information responsive to a statistics query. For example, given a statistics query that contains only one query term, "iPod", the news backend server 620 counts the number of occurrences of the term within a particular week's news coverage. For each week, the news backend server also selects a piece of news from a credible news source as the representative news item or story of that week. In some embodiments, the representative news story having the "most representative headline." And the "most representative headline" may be defined as the headline whose terms appear most frequently among all the matching news items (i.e., news items matching the statistics query) during that week. A more detailed description of the news backend server can be found in the U.S. patent application Ser. No. 11/239,684, entitled "Labeling Events in Historic News" filed Sep. 30, 2005, which is incorporated herein by reference in its entirety. The frontend server 602 is responsible for initially parsing the statistics query and is also responsible for preparing query results (e.g., generating images and HTML files, etc.) based on the query results generated by the news backend server 620 and the query log servers 312, respectively.

Within the hierarchical structure of the query log servers 312, there is a root query server 604. The root query server 604 is responsible for generating a set of sub-queries in response to a statistics query, identifying a subset of intermediate query servers 606 for a selected subset of sub-queries, distributing the selected sub-queries to the identified intermediate query servers 606, and aggregating the query results returned by different intermediate query servers 606. An intermediate query server 606 is responsible for identifying a respective subset of leaf query servers 608 for each sub-query, distributing the sub-query to the leaf query servers, and aggregating the query results returned by different leaf query servers 606. A leaf query server 608 is responsible for aggregating data or information from its associated partition of sorted query session records 610 in accordance with the sub-query assigned to the leaf query server. A more detailed description of the data aggregation process is provided below in connection with FIG. 8.

The number of layers in the hierarchical structure may depend on the volume of query session records in the database. The example shown in FIG. 6 is only for illustrative purposes. In some embodiments, if the volume of the query session records is limited, the intermediate layer of query servers 606 is not necessary. In these embodiments, the root query server 604 is directly responsible for distributing sub-queries to different leaf query servers 608 and aggregating their query results accordingly. In some other embodiments, more intermediate layers of query servers 606 may be necessary to process a large volume of query session records. One skilled in the art will appreciate that a specific hierarchical structure design is chosen to maximize the system's throughput.

For the purposes of explaining the operation of an exemplary embodiment of the system shown in FIG. 6, the exemplary embodiment will be assumed to have 1024 database partitions, each of which contains data for at least one million query sessions. Thus, when a sub-query is executed against 25 database partitions, about 2.5 percent of the database is being sampled by the execution of that sub-query. In addition, while the number of leaf query servers 108 may be the same as the number of database partitions, in some embodiments, some or all of the leaf query servers 608 service two or more (e.g., two to four) database partitions.

As noted above, the entire volume of query session records are broken into L partitions. In some embodiments, the value "L" is also the number of leaf query servers in the hierarchical structure. Query session records are randomly assigned to the leaf query servers. The query session records at a particular leaf query server are sorted by their respective users, but are otherwise distributed randomly. For example, one set of session records associated with a user from the United States may be preceded by a set of session records associated with a user from Germany and followed by another set of session records associated with a user from India. The session records associated with a particular user are also distributed randomly according to the same or similar principle.

Due to the random distribution of query records among the database partitions, and the fact that each database partition contains millions of query session records, each database partition has coverage of representative query sessions very similar to that of the entire database. A statistical estimate based on a subset (e.g., one, or a few) of the database partitions is often sufficiently close to a statistical estimate based on all the database partitions. In other words, there is no need to invoke all the leaf query servers for every single statistical query. This can significantly boost the query processing system's throughput. On the other hand, an estimate based on too few data samples is not a reliable approximate of an estimate based on the entire database. There must be a sufficient number of data samples to ensure the reliability of an estimate based on a subset of a database, and also to ensure that reported statistics cannot be traced back to individual users or even to small groups of such users.

Figure 13:
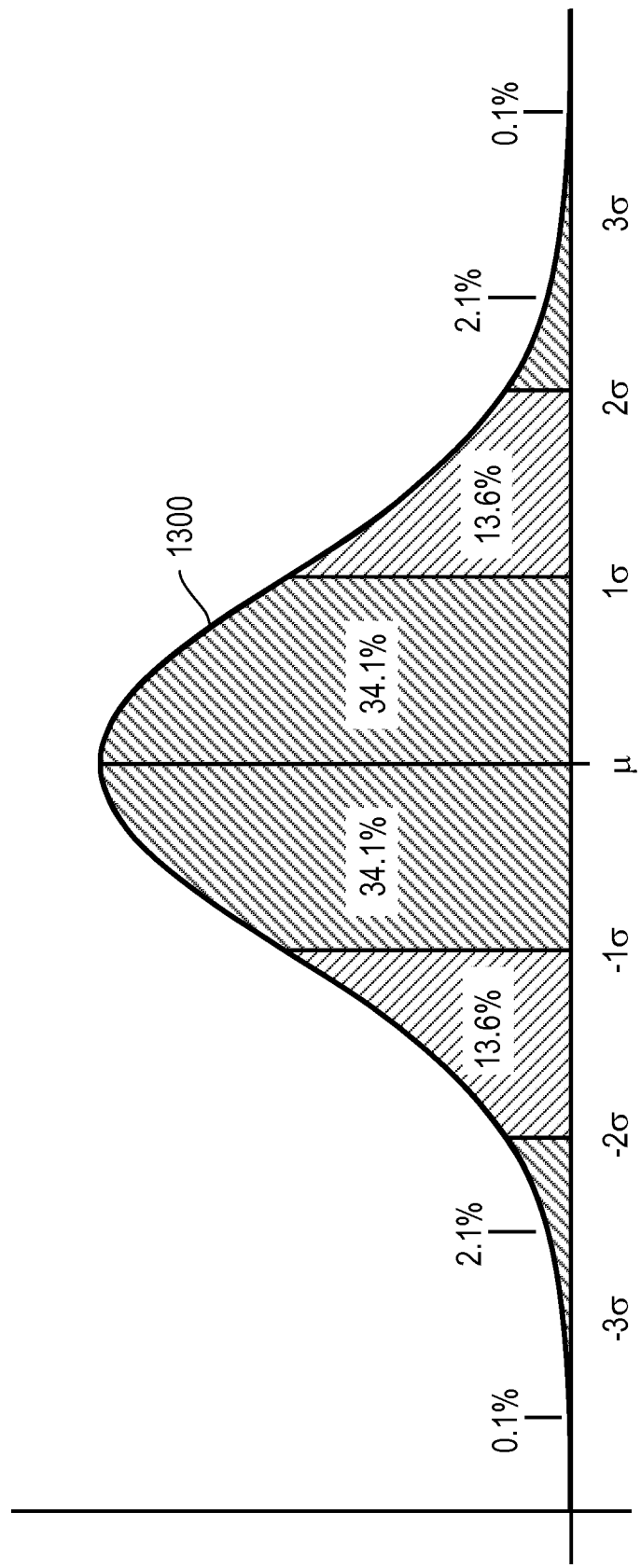
FIG. 13 is a diagram of a bell-shaped curve representing a normal distribution of random data samples.

In statistics, the standard deviation is a common measure of the distribution of data samples within a dataset and the normal distribution, also called Gaussian distribution, is an extremely important probability distribution in many fields. FIG. 13 is a diagram of a bell-shaped curve 1300 representing the probability density of a random variable X having a normal distribution. The value μ in the middle corresponds to the mean of all the data samples within a dataset of the random variable X and the value σ represents the standard deviation of the dataset. If the random variable X takes on data values $\{x_1, x_2, \ldots, x_N\}$, below are the respective definitions of the mean μ and the standard deviation σ, $$\mu = \frac{1}{N}\sum_{i=1}^{N} x_i = \frac{x_1 + x_2 + \ldots + x_N}{N},$$

and $$\sigma = \sqrt{\frac{1}{N}\sum_{i=1}^{N}(x_i - \mu)^2}.$$

As shown in FIG. 13, in the case of a normal distribution, one standard deviation σ from the mean μ accounts for 68.26% of the set of data values. In other words, nearly 70% of all the data samples generated by the random variable X are between [μ−σ, μ+σ]. Similarly, two standard deviations 2σ from the mean μ account for 95.5%, and three standard deviations 3σ from the mean μ account for 99.7% of the entire set of data values. A large standard deviation indicates that the data samples are far from the mean and a small standard deviation indicates that they are clustered closely around the mean. For a random variable having a normal distribution, the more data points that are sampled, the more likely we are to get a small standard deviation and therefore a more reliable estimate of the mean of the random variable.

In the present invention, the distribution of millions of session records and their associated users within a database partition can be approximated by a normal distribution. The formula above can be used to provide guidance with respect to the number of users required to produce a reliable statistical estimate. For example, to estimate the probability of a query including a specific term, a leaf query server may need to scan through tens of thousands of session records until a predetermined number of queries containing the specific term are found. In some embodiments, this predetermined number is one thousand, two thousand, or a number larger than two thousand (e.g., at least 2,500 positive samples). The magnitude of the predetermined number is, at least in part, dependent upon the ratio of the sub-sampled query log versus the entire query log and their absolute sizes. There are many known statistical theories on how to determine the number of data samples for given reliability requirements.

In order to identify at least a predetermined number of matching query session records, a two-step approach is described below in connection with FIG. 7. The first operation is to search a selected subset of the database partitions for matching query sessions. The second operation is to search additional database partitions (by employing additional leaf query servers) to conduct a new search if the first search operation fails to return at least the predetermined number of matching query session records. Therefore, the first operation is always required and the second operation is conditional.

Figure 7:
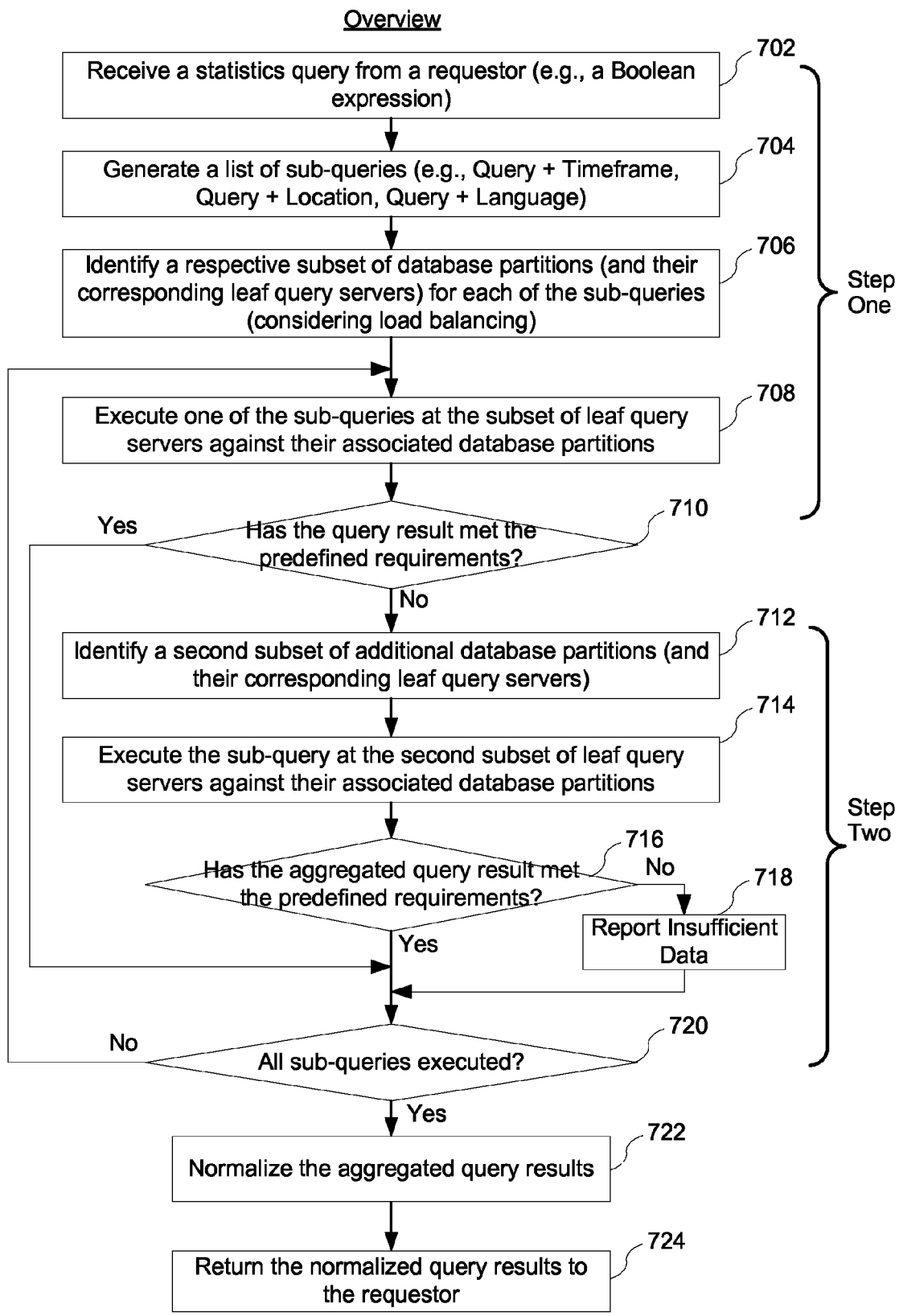
FIG. 7 is a flowchart illustrating a process of generating statistics from session records in response to a statistics query in accordance with some embodiments of the present invention.

As shown in FIG. 7, there are several sub-operations within each primary operation. Within the first operation, the root query server first receives a statistics query from a requestor (702). The query may include one or more query terms. These query terms are combined together using one or more Boolean operators such as AND, OR, etc. Next, the root query server generates a list of sub-queries based on the statistical query (704). For example, given the statistical query having only one term "iPod", the root query server may generate a series of sub-queries for a predetermined period of time, each sub-query for determining the percentage of users having submitted at least one iPod-related query in a given week. Similarly, the root query server may also generate sub-queries to determine the percentage of users having submitted at least one iPod-related query from a set of distinct locations, or using a set of distinct languages.

The root query server (or the root query server in conjunction with one or more of intermediate query servers) identifies a subset of the database partitions, and their corresponding leaf query servers, for each sub-query (706). In doing so, the root query server checks the workload and free resources available at different leaf query servers and then selects one or more database partitions against which to execute the sub-query to achieve an overall load balance. Since there may be multiple leaf query servers executing the same sub-query, each leaf query server is only responsible for identifying a fraction of the predetermined number of matching query sessions. For example, if the original predetermined number for the entire database is 2500 and 25 database partitions are selected to execute a sub-query, each corresponding leaf query server only needs to identify 100 instances of matching query session records within each of its selected database partitions. Alternately, each leaf query server may be asked to identify up to N instances of matching query session records in each of its selected database partitions, where N is larger (e.g., 10 percent to 100 percent larger) than the predefined number divided by the number of database partitions being queried. Next, the sub-queries are executed by their respective subsets of leaf query servers (708). A more detailed description of this sub-operation is provided below in connection with FIG. 8.

After completing the assigned sub-query, a selected subset of leaf query servers return their query results to the root query server. The root query server then aggregates these query results and checks if the aggregated query result has met some predetermined requirements (710). There are two possible outcomes for the aggregated query result. If the leaf query servers have found their shares of matching query session records in their database partitions, the aggregated query result is deemed as a reliable approximation of the query result derived from the entire database. In this event, Step Two is skipped. The root query server checks if all sub-queries have been executed (724). If not, the root query server returns to operation 708 and asks the leaf query servers execute another sub-query. In some embodiments, operation 708 launches all of the identified sub-queries prior to receiving the results for any of these sub-queries. In these embodiments, the loop control operation 720 is not needed.

If the total number of matching query session records identified by the leaf query servers has not reached the predetermined number, the root query server identifies a second subset of additional database partitions and their corresponding leaf query servers (712). For example, if the average number of matching query sessions identified in the initially selected 25 database partitions is only 50 (for a total of approximately 1250 matching query session records), the root query server identify at least another 25 database partitions on which to execute the same sub-query. In some embodiments, the root query server may identify more than 25 (e.g., 30) database partitions (and their leaf query servers) to make sure that a sufficient number of matching query sessions are found. Next, the newly-selected leaf query servers execute the same sub-query against their associated database partitions (714). The root query server then checks if the aggregated query result has met the predetermined requirements (716). If the number of matching query sessions is still below the predetermined number (716, No) and the root query server predicts that there is not sufficient data in the entire database (718), the root query server makes a mark in an entry in the query result corresponding to the sub-query. The frontend server, upon receiving the query result, can use other measures (e.g., data interpolation) to fix the missing entry, or it may omit the query result corresponding to the sub-query that returned an insufficient number of results. After executing all the sub-queries (720, Yes), the root query server normalizes the aggregated query results (722) and returns them to the requestor through the frontend server (724).

Figure 8:
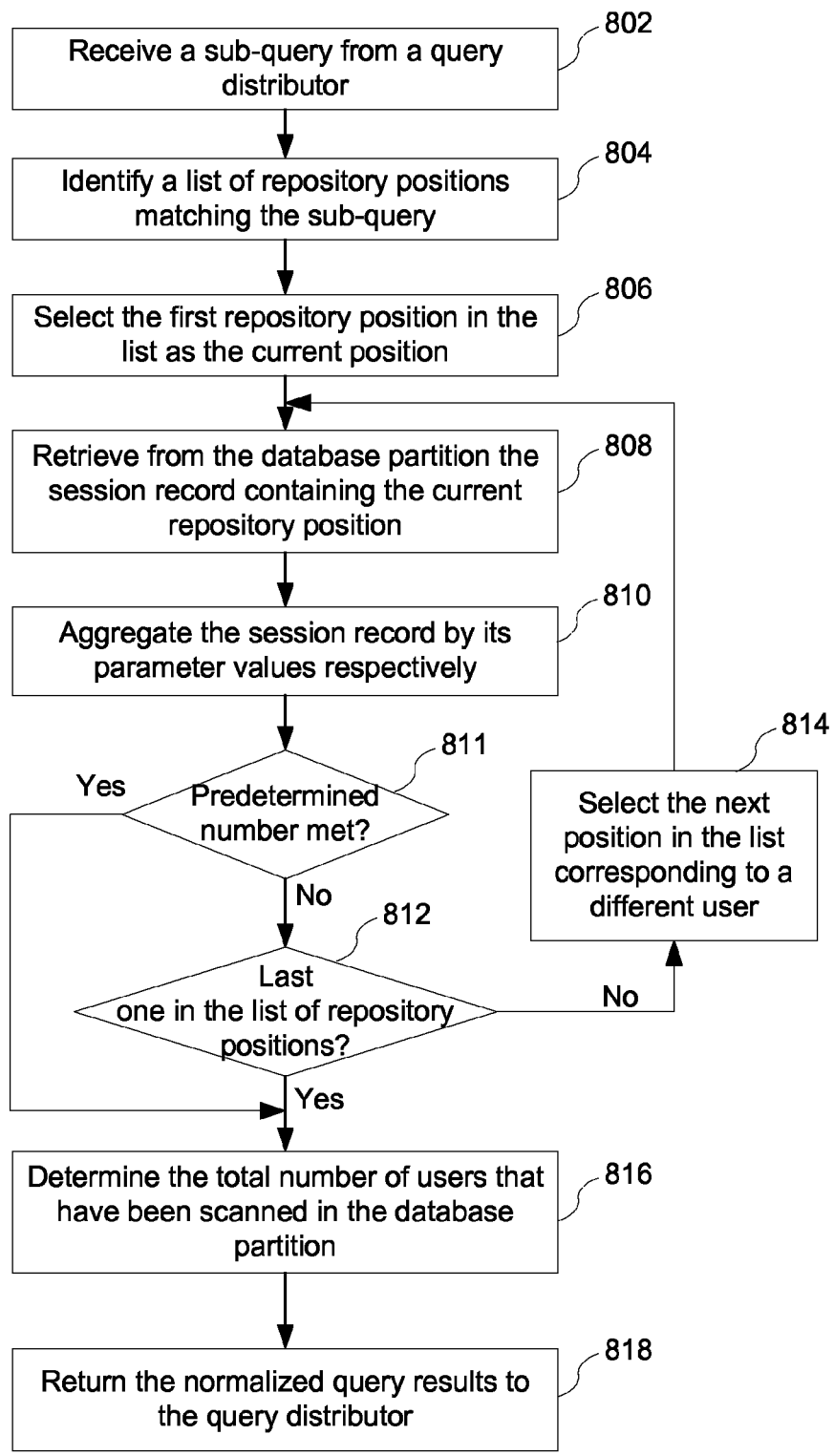
FIG. 8 is a flowchart illustrating a process of executing a statistics sub-query at a leaf query server in accordance with some embodiments of the present invention.

FIG. 8 is a flowchart illustrating how a leaf query server executes a sub-query in accordance with some embodiments of the present invention. Upon receipt of a sub-query from a query distributor (e.g., the root query server), the leaf query server visits the tokenspace inverse index 314 and identifies a list of repository positions for the sub-query (804). If the sub-query is a Boolean expression including more than one query term, the leaf query server identifies the repository position lists corresponding to different query terms and then generates a list of query sessions that satisfy the Boolean expression. As noted above, the list of repository positions for any given query term (i.e., token) corresponds to the locations of the query term(s) in the matching query session records. To map the repository positions to session records and/or user identifiers, the leaf query server consults the two look-up maps (mapping repository positions to session IDs, and mapping session IDs to user IDs) discussed above with reference to FIGS. 5B and 5C. Moreover, the leaf query server must access the query session records themselves in order to aggregate their parameter values (e.g., time, location and language).

The leaf query server selects the first repository position in the list as the current repository position (806). If the sub-query is a "discovery" sub-query, the leaf query server identifies the query session (using look-up map 508) that encompasses the current repository position and then retrieves the query session record from the database partition (808). Next, the leaf query server aggregates the query session record by its parameter values (810). For example, if the sub-query is to count the unique users whose query session records fall into a particular week (e.g., the sub-query is "iPOD AND week=103"), the leaf query server simply increments a count value. If the sub-query is a discovery sub-query (e.g., identify the cities of the users who submitted matching queries), the leaf query server identifies the value of the session parameter (e.g., city) and adds a count to a corresponding counter.

Depending upon the number of database partitions selected for a particular sub-query, each leaf query server is responsible for identifying a predetermined number of matching query sessions in corresponding database partition. As noted above, this predetermined number is typically a fraction of the number for the entire database. Every time the leaf query server finds a matching query session, it needs to check if the current count of matching query sessions has met the predetermined number (811). If so, the leaf query server does not have to proceed to a subsequent repository position in the list. Rather, the leaf query server moves to determine the total number of users that have been scanned (816). Otherwise, the aggregation moves onto the next repository position in the list (814).

After finishing the data aggregation operation, the leaf query server checks if the current repository position is the last one in the list (812). If not, the leaf query server proceeds to a subsequent repository position in the list (814). Note that if the leaf query server generates user-based query results, the next repository position that matches the sub-query may not be the correct one since it may be associated with the same session (e.g., one query session record may include multiple instances of the query term like "iPod") or a different session that corresponds to the same user. Therefore, the leaf query server must find the first repository position corresponding to a different user than the previously processed session record.

In some embodiments, from the current user, the leaf query server finds an entry including the next user in the look-up map 510. The same entry also includes the starting session ID corresponding to the next user. Based on the starting session ID, the leaf query server visits the look-up map 508 to identify the starting repository position corresponding to the starting session ID. Based on this starting repository position, the leaf query server then examines its list of repository positions to find the first repository position in the list of query-matching repository positions that is beyond that starting position.

Alternately, operation 804 may identify a list of sessions that match the sub-query, and operations 806 and 808 utilize the identified list of matching sessions.

If all the repository positions (or matching sessions) in the list have been processed (812, Yes), the leaf query server then determines the total number of users that have been scanned in the database partition (816). This sub-operation also involves the two look-up maps 508 and 510. The leaf query server first checks the look-up map 508 to find the session ID whose record contains the last repository position in the list. From the session ID, the leaf query server finds the corresponding user ID in the look-up map 510. The user ID associated with the smaller starting session ID corresponds to the total number of users that have been scanned in the database partition. Finally, the leaf query server normalizes the query result using the total number of scanned users and returns the normalized query result to the query distributor (818).

Generally, there are two types of normalization in connection with the generation of user-based statistics. For example, in order to find the popularity of the query term "iPod" in different weeks, the root query server generates at least two sub-queries for each particular week. One sub-query N("iPod", "WEEK=xyz") estimates the number of users that have submitted at least one iPod-related query during the week and the other sub-query N("WEEK=xyz") estimates the number of users that have submitted any query during the same week N("WEEK=xyz"). Since there may be a significant growth of users visiting the web search engine from week to week, the number corresponding to the query N("iPod", "WEEK=1000") may also increase from week to week without indicating any increase in popularity of the query. Without normalization, changes in the numbers corresponding to the query N("iPod", "WEEK=xyz") from week to week may not corresponding to changes in popularity. Therefore, the popularity of the query term "iPod" has to be expressed in a normalized fashion as $$P = \frac{N(\text{``iPod''}, \text{'WEEK} = xyz\text{''})}{N(\text{``WEEK} = xyz\text{''})}.$$

As noted above, when a leaf query server executes a sub-query N("iPod", "WEEK=xyz"), it may stop short of determining the total number of users who have submitted at least one iPod-related query during the week "xyz". Rather, the leaf query server may stop its search when it finds a predetermined number of such users (e.g., 100 if 25 database partitions are being searched). But in order to find the 100 users, the leaf query server must scan a larger number of users, i.e., the total number of scanned users determined at sub-operation 816. If the query is very popular, the leaf query server may not need to scan too many users to reach the goal of 100. But if the query is not popular, the leaf query server must scan a substantial number of users to reach the goal of 100. In other words, the total number of scanned users for each sub-query indicates the popularity of the sub-query. A higher total number of scanned users correspond to a less popular sub-query.

Therefore, the number corresponding to the query N("iPod", "WEEK=xyz") should be expressed in a normalized fashion as $$N(\text{``iPod''}, \text{'WEEK} = xyz\text{''}) = \frac{C_{Predetermined\_number}}{C_{Total\_Users\_Scanned}},$$

where $C_{Predetermined\_Number}$ corresponds to the predetermined number of matching query session records the leaf query server was asked to find and $C_{Total\_Users\_Scanned}$ represents the total number of users that the leaf query server has scanned in order to reach the predetermined number of matching query sessions. In some embodiments, the two normalizations are merged into one sub-operation 722 of FIG. 7. In this case, the leaf query server returns the total number of scanned users for each individual sub-query at operation 818 of FIG. 8.

In some embodiments, the execution of one statistics query as described above in connection with FIG. 7 may bring forward a set of subsequent candidate statistics queries. For example, when a user submits a statistics query for the term "iPod", besides the term's popularity over time, the user may be interested in learning the top 10 cities that have the largest number of users submitting at least one iPod-related query. But this information cannot be generated during the first pass of executing the statistics query for "iPod" because there could be thousands of cities having at least one user submitting an iPod-related query. This list of cities is unknown at the time of executing the query for "iPod". Even if this list is known, it would not be practical for the root query server to generate even hundreds of sub-queries in order to identify and generate statistics for the top 10 cities. This massive number of sub-queries would adversely affect the throughput of the query log servers.

Figure 9:
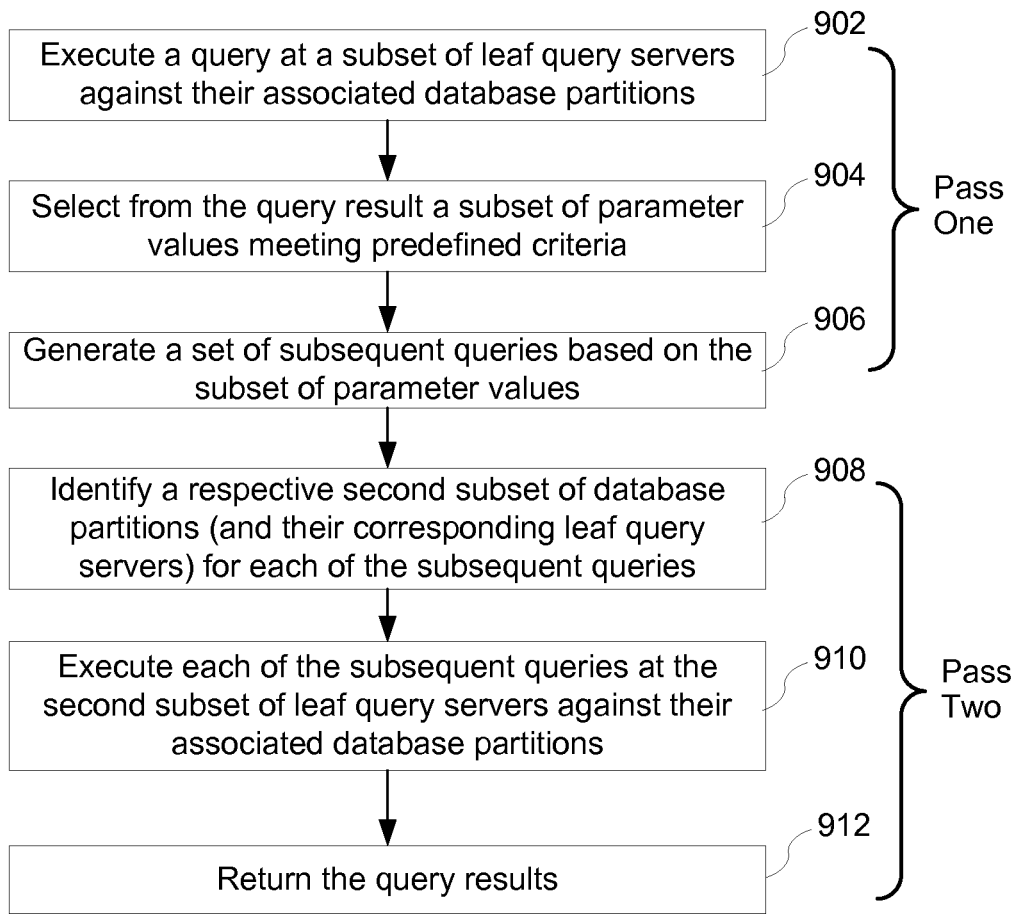
FIG. 9 is a flowchart illustrating a two-pass or multi-pass process of generating statistics related to a specific parameter of the session records in accordance with some embodiments of the present invention.

FIG. 9 is a flowchart illustrating a two-pass process of identifying the top N candidates without generating a large number of sub-queries. The first pass of the process includes three operations 902, 904, and 906. Operation 902 is similar to the process shown in FIG. 7. The root query server executes a statistics query at a selected subset of leaf query servers (i.e., against a selected subset of the database partitions). For example, the statistics query has only one query term "iPod". The leaf query servers identify the users having at least one iPod-related query and aggregate the user by their associated cities, regions, countries and languages. Next, the root query server selects from the aggregated query results a subset of parameter values meeting predefined criteria (904). For example, the root query server selects the top 25 cities, regions, countries and/or languages based on the aggregated query results. Since a database partition is like a smaller version of the entire database, it is very likely that the top 25 candidates identified by the leaf query servers encompass the top 10 candidates, although the candidates' order may not be exactly the same. For each of the top 25 candidates in different categories, the root query server generates a new subsequent statistics query (906). The first pass of the process is also referred as the discovery pass. Its goal is to reduce the number of candidates from several thousand to a few dozen by performing a "discovery" search of a small subset of the database partitions.

The second pass of the process is referred to as the refinement pass. From the query results of the discovery pass, the root query server not only has a list of candidates for each parameter category, but also has reasonable estimates of the densities of query session records containing the different candidates. For each subsequent statistics query, the root query server identifies (i.e., selects) a respective subset of database partitions (and their corresponding leaf query servers) (908). The number of the database partitions depends on the density estimate associated with the subsequent query. A query having a lower density estimate needs to be executed against more database partitions to find the predetermined number of matching query session records. Next, the root query server executes each of the subsequent queries at the corresponding subset of leaf query servers against the identified database partitions (910). Finally, the root query returns the query results associated with the subsequent queries to the requestor (912). Since the second pass has found a sufficient number of matching records for each query, the query result generated at the second pass is more reliable than that of the first pass. But the first pass substantially reduces the number of candidates and makes it possible to execute the second pass efficiently.

Figure 10A:
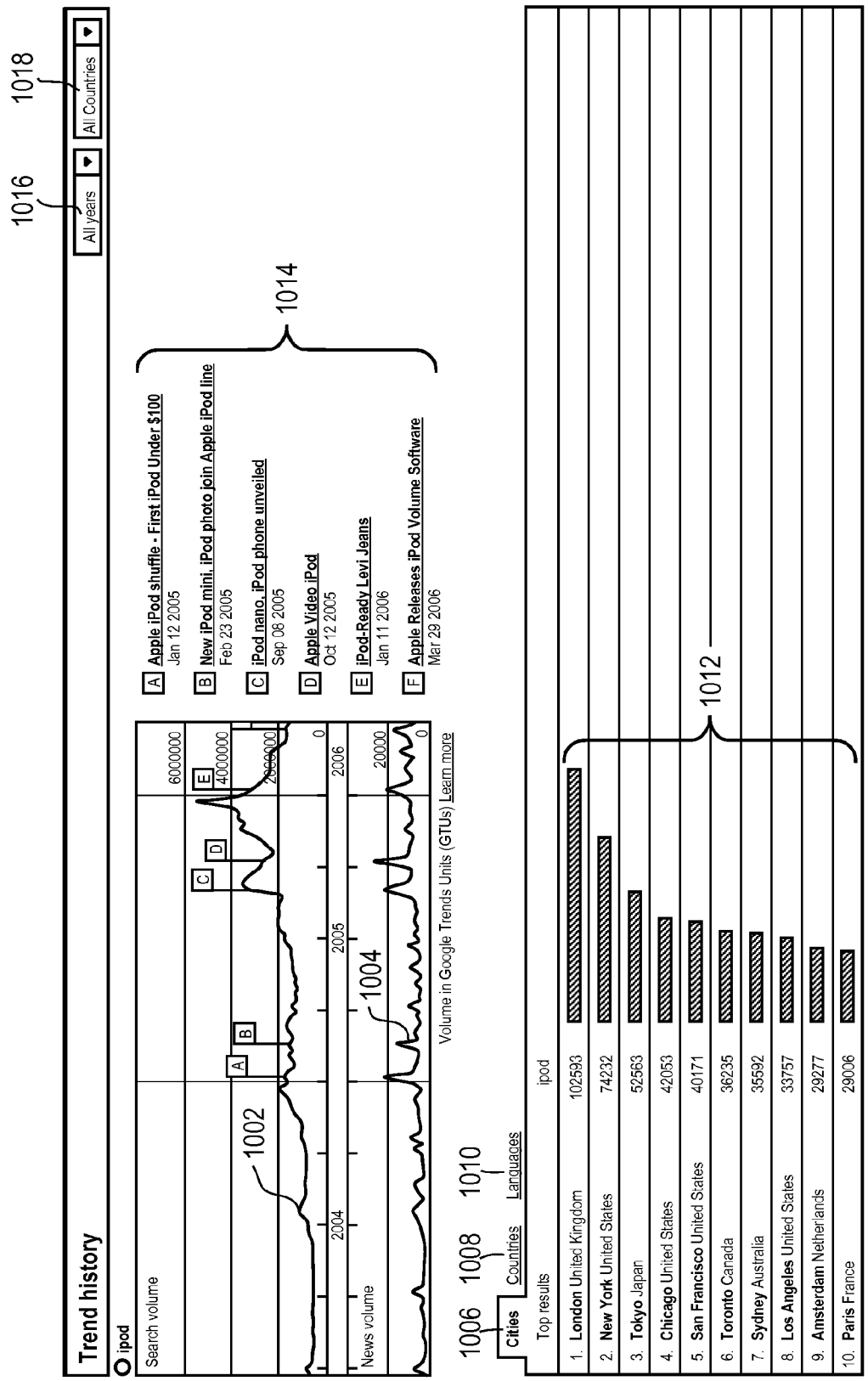
FIGS. 10A, 10B and 10C are exemplary screenshots of webpages containing trends statistics and geographical distribution statistics for queries concerning a particular query term in accordance with some embodiments of the present invention.

FIG. 10 is an exemplary screenshot of a webpage containing statistics about users related to a particular query term "iPod". The webpage includes various types of statistical information. It takes less than a second for the statistical query processing system to generate this webpage.

Some of the statistical information is time-based. For example, the curve 1002 represents the popularity of the term "iPod" over a time period of more than two years. Each data point on the curve 1002 corresponds to a ratio between the number of users that have submitted at least one iPod-related query during a particular week and the number of users that have submitted any query during that week. The curve 1002 has both peaks and troughs suggesting that the term's popularity indeed varies with time.

Below the curve 1002 is another curve 1004. This curve represents the volume of news coverage of iPod during the same time period. Each data point on the curve 1004 represents the number of occurrences of the term "iPod" in that week's news coverage. The spikes on the curve 1004 indicate increases in news coverage concerning the iPod product during that week. The frontend server selects the weeks corresponding to six spikes on the curve 1004 and marks the corresponding weeks on the curve 1002 using labels A-F. For some of the spikes on the news curve 1004, there is a corresponding increase of users submitting the iPod-related query. For example, the label C indicates that the increase in iPod-related queries is in synch with the news coverage spike. The representative news during that week is that Apple releases its new generation of product, iPod Nano and iPod phone.

In contrast, although label D corresponds to the highest news coverage spike on the curve 1004, there is no significant increase of iPod-related queries. The representative iPod-related news is that Apple releases its iPod Video. A comparison of the two curves 1002 and 1004 may provide valuable insights to various persons (e.g., marketing professional, social scientist, etc.) and organizations.

Below the two curves are three tabs, 1006 for cities, 1008 for countries and 1010 for languages. Under the Cities tab 1006 are the top 10 cities that have the largest number of users that have submitted at least one iPod-related query. Note that the number next to each city is not necessarily the actual number of users from that city. It is a value representing the scale of one city versus a reference value. To the right of the numbers is a bar chart 1012. The bar chart 1012 illustrates the volume of users from the top 10 cities in a more intuitive manner. When a user clicks the Countries tab 1008 or the Language tab 1010, the statistics query processing system receives a new statistics request and then generates query results using the two-pass process described above in connection with FIG. 9.

Figure 10B:
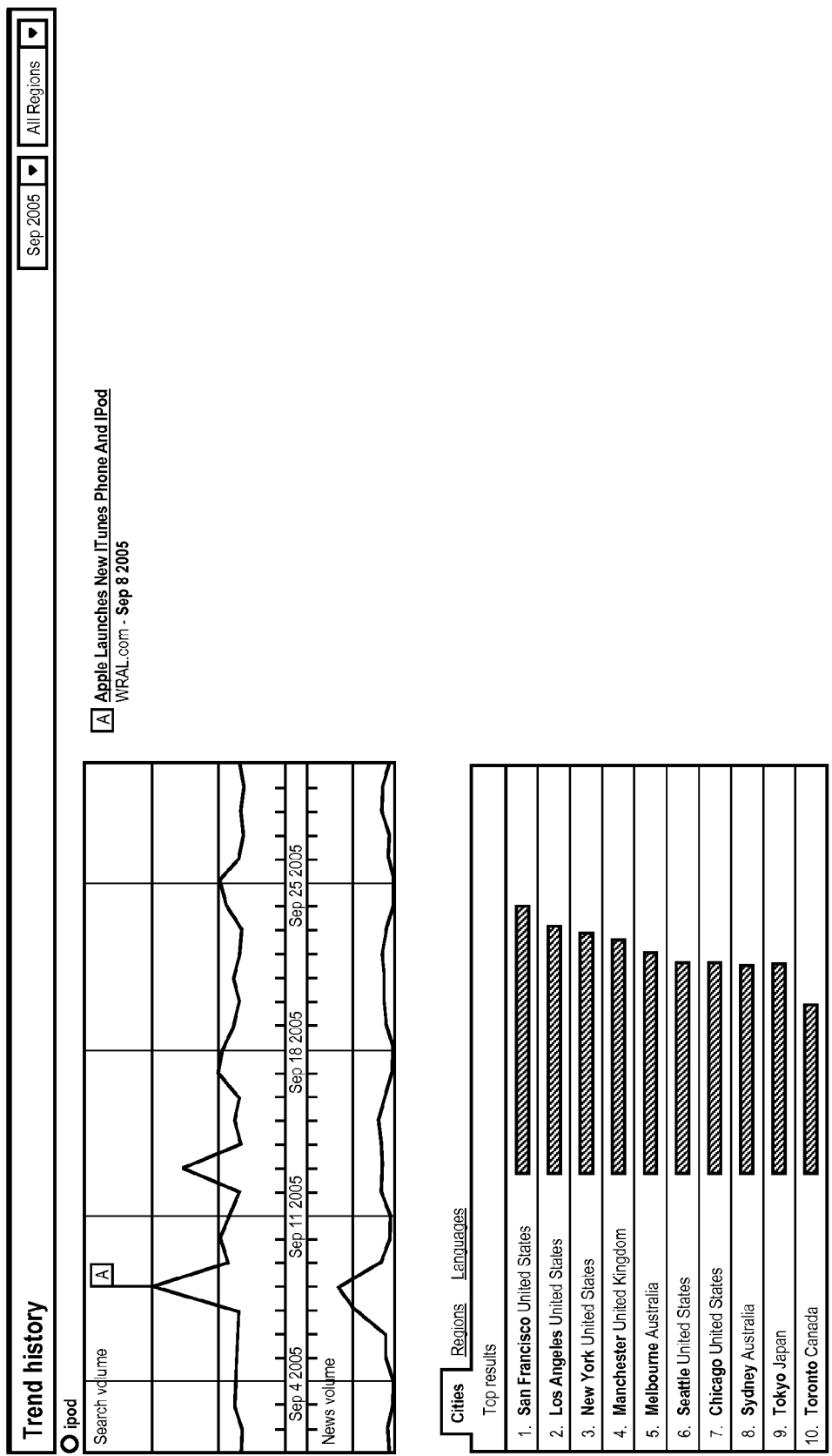
Figure 10C:
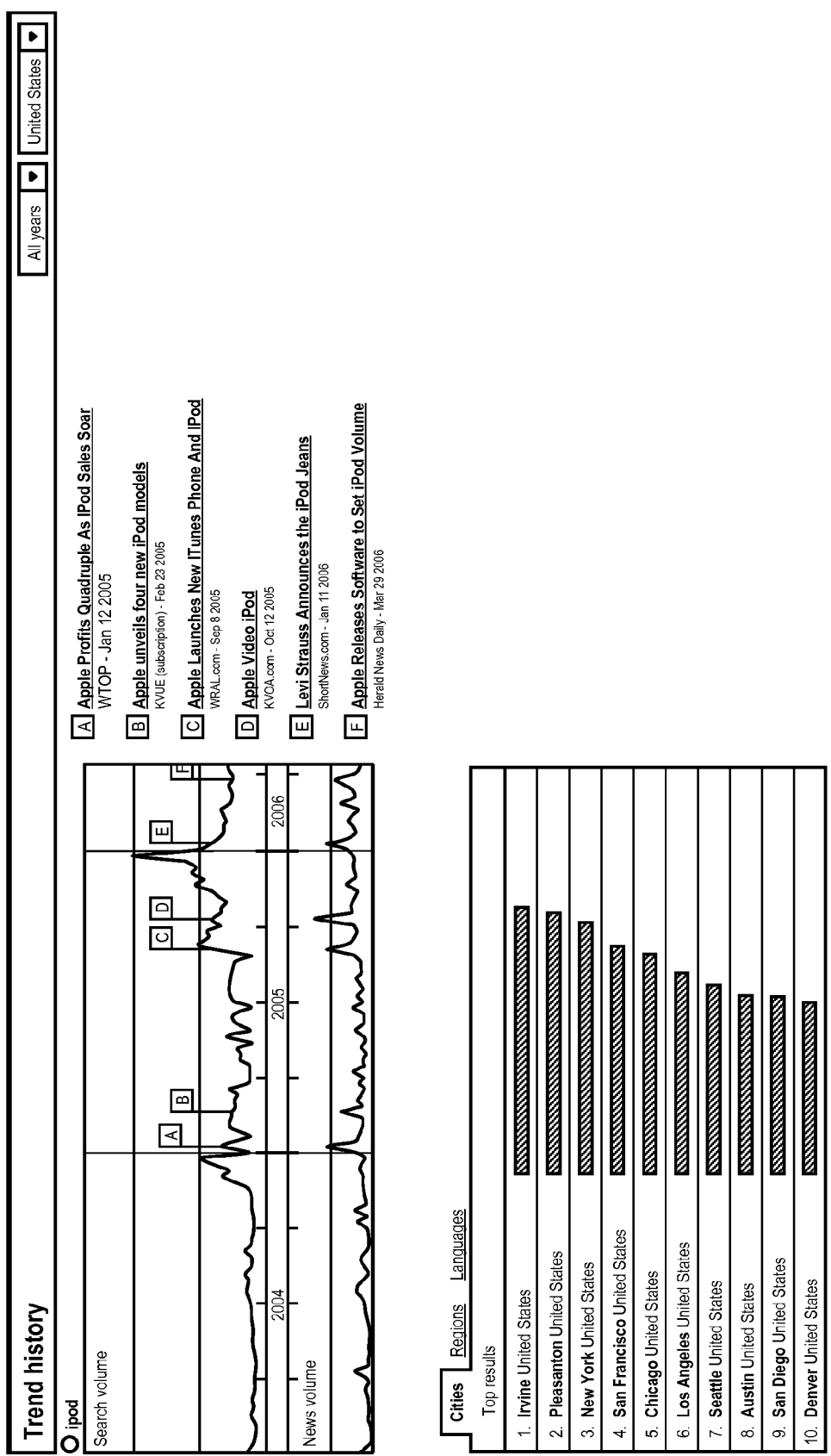

On the top-right corner of the screenshot are two dropdown lists, 1016 for date sub-ranges (labeled "years") and 1018 for countries. A user can request that the prior inquiry be re-executed for a particular month, in which case a new webpage is provided that reflects statistics based on the query session records for that month, as shown in FIG. 10B. Similarly, a user request that the prior inquiry be re-executed for a particular country, in which case a new webpage is provided that reflects statistics based on the query session records for that country, as shown in FIG. 10C.

Figure 11A:
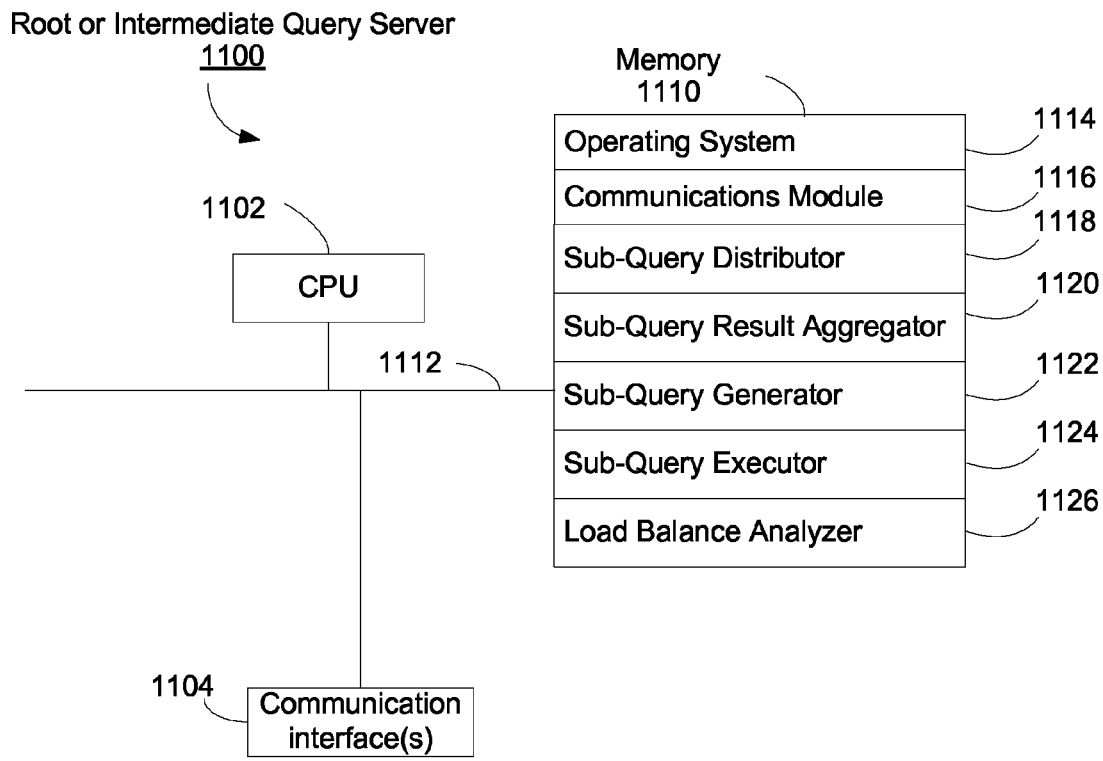
FIG. 11A is a block diagram of an exemplary query distribution and aggregation server in accordance with some embodiments of the present invention.

FIG. 11A is a block diagram of an exemplary query distribution and aggregation server (e.g., a root query server or intermediate query server) 1100 in accordance with some embodiments of the present invention, which typically includes one or more processing units (CPU's) 1102, one or more network or other communications interfaces 1104, memory 1110, and one or more communication buses 1112 for interconnecting these components. Memory 1110 may include high speed random access memory and may also include non-volatile memory, such as one or more magnetic disk storage devices. Memory 1110, or alternatively non-volatile memory within memory 1110, comprises a computer readable storage medium having stored thereon data representing sequences of executable instructions. Memory 1110 or the computer readable storage medium of memory 1110 preferably stores the following programs, modules and data structures, or a subset or superset thereof:

- an operating system 1114 that includes procedures for handling various basic system services and for performing hardware dependent tasks;
- a network communication module (or instructions) 1116 that is used for connecting the query server 1100 to other computers via the one or more communication network interfaces 1104;
- a sub-query distributor 1118 for assigning a sub-query to a selected subset of database partitions and their corresponding leaf query servers;
- a sub-query result aggregator 1120 for aggregating query results generated by leaf query servers;
- a sub-query generator 1122 for generating a set of sub-queries for a statistics query; and
- a load balance analyzer 1126 for analyzing the workload at different leaf query servers and selecting a subset of the leaf query servers based upon their workload.

Figure 11B:
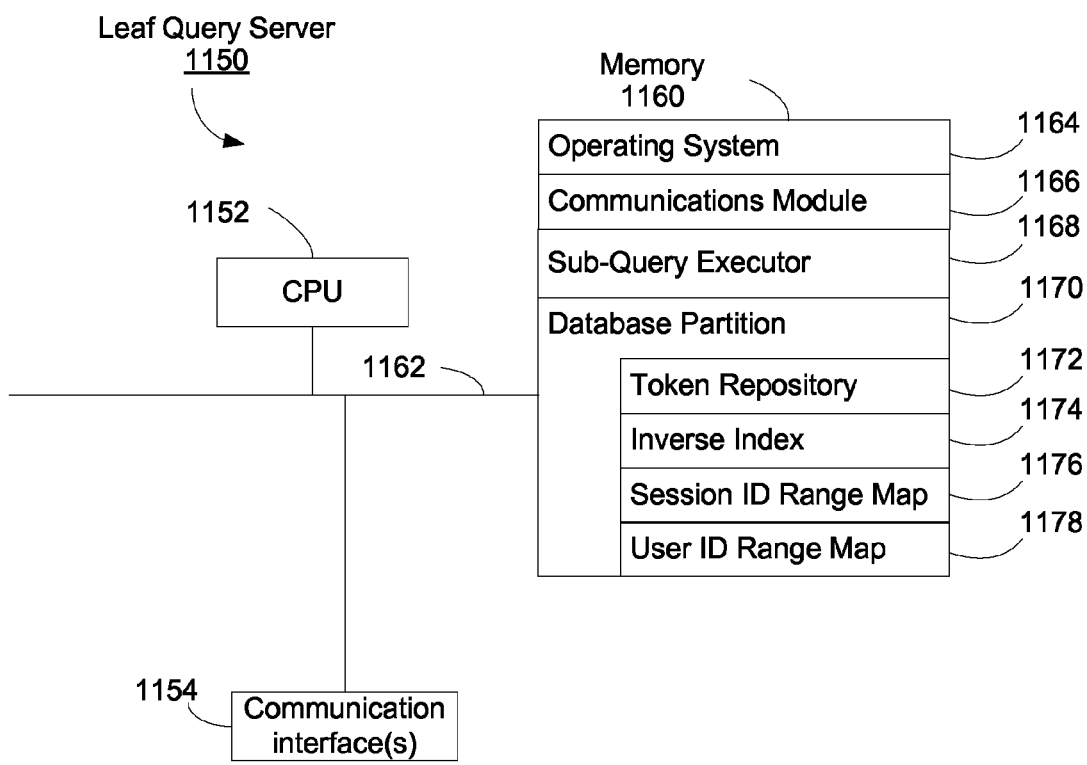
FIG. 11B is a block diagram of an exemplary leaf query server in accordance with some embodiments of the present invention.

FIG. 11B is a block diagram of an exemplary leaf query server 1150 in accordance with some embodiments of the present invention, which typically includes one or more processing units (CPU's) 1152, one or more network or other communications interfaces 1154, memory 1160, and one or more communication buses 1162 for interconnecting these components. Memory 1160 may include high speed random access memory and may also include non-volatile memory, such as one or more magnetic disk storage devices. Memory 1160, or alternatively non-volatile memory within memory 1160, comprises a computer readable storage medium having stored thereon data representing sequences of executable instructions. Memory 1160 or the computer readable storage medium of memory 1160 preferably stores the following programs, modules and data structures, or a subset or superset thereof:

- an operating system 1164 that includes procedures for handling various basic system services and for performing hardware dependent tasks;
- a network communication module (or instructions) 1166 that is used for connecting the query server 1100 to other computers via the one or more communication network interfaces 1104;
- a sub-query executor 1168 for executing a sub-query against a database partition; and
- one or more database partitions 1170, each of which may include a token repository 1172, an inverse index 1174, a session ID range map (session ID to token position map) 1176, and a user ID range map (user ID to session ID map) 1178.

Figure 12:
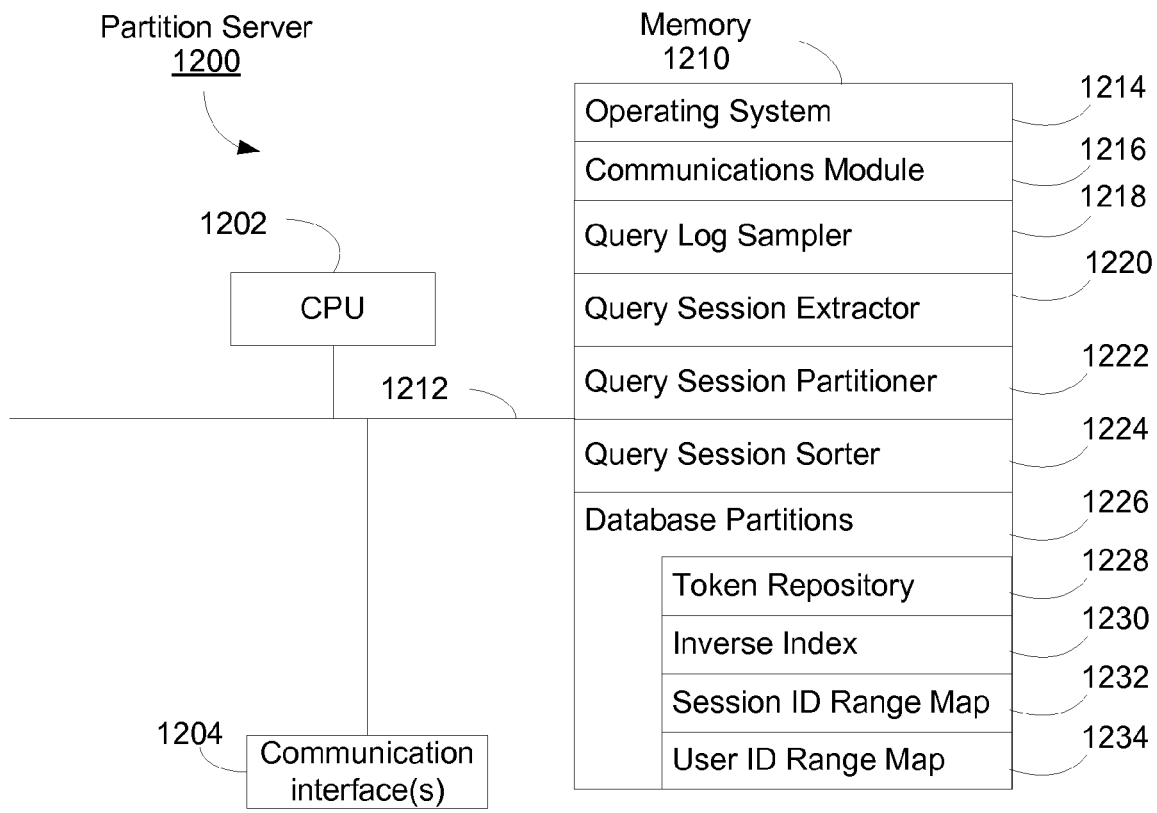
FIG. 12 is a block diagram of an exemplary partition server in accordance with some embodiments of the present invention.

FIG. 12 is a block diagram of an exemplary query session partition server 1200 in accordance with some embodiments of the present invention, which typically includes one or more processing units (CPU's) 1202, one or more network or other communications interfaces 1204, memory 1210, and one or more communication buses 1212 for interconnecting these components. Memory 1210 may include high speed random access memory and may also include non-volatile memory, such as one or more magnetic disk storage devices. Memory 1210, or alternatively non-volatile memory within memory 1210, comprises a computer readable storage medium having stored thereon data representing sequences of executable instructions. Memory 1210 or the computer readable storage medium of memory 1210 preferably stores the following programs, modules and data structures, or a subset or superset thereof:

- an operating system 1214 that includes procedures for handling various basic system services and for performing hardware dependent tasks;
- a network communication module (or instructions) 1216 that is used for connecting the partition server 1200 to other computers via the one or more communication network interfaces 1204;
- a query log sampler 1218 for sampling a web search engine's query log;
- a query session extractor 1220 for grouping different query records into different query sessions in accordance with predefined criteria;
- a query session partitioner 1222 for breaking the entire query session database into multiple partitions;
- a query session sorter 1224 for sorting the query session records within a partition by their associated users; and
- multiple database partitions 1226, each database partition having a token repository 1228, an inverse index 1230, a session ID range map 1232 and a user ID range map 1234.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a server system, distinct from a client system, the server system having one or more processors and memory storing programs executed by the one or more processors:
   responding to a request from the client system for statistics of occurrence of a user-identified event, the responding including:
   accessing a database of events;
   identifying instances of occurrence of the user-identified event in at least a subset of the database of events to produce representative statistics of occurrence of the user-identified event within the entire database of events;
   generating a result including at least a portion of the representative statistics of occurrence of the user-identified event, the result including sub-results comprising at least representative statistics of occurrence of the user-identified event during each of a plurality of time periods, representative statistics of occurrence of the user-identified event in each of a plurality of geographic locations or representative statistics of occurrence of the user-identified event with respect to each of a plurality of languages;
   sending to the client system for display at the client system the result, including the sub-results;
   wherein the sub-results comprise normalized representative statistics of occurrence of the user-identified event that indicate differences in popularity of the user-identified event during the plurality of time periods, differences in popularity of the user-identified event in the a plurality of geographic locations and/or differences in popularity of the user-identified event with respect to the plurality of languages.

2. The method of claim 1, wherein an event in the database of events includes one or more mini-sessions, each mini-session having a user identifier, a temporal value, a geographic location value, and one or more query strings.

3. The method of claim 2, wherein the representative statistics of occurrence of the user-identified event includes numbers of instances of the event within multiple time periods, and the method including aggregating instances of the event in each of the plurality of respective time periods based on their associated mini-session temporal values.

4. The method of claim 2, wherein the representative statistics of occurrence of the user-identified event includes numbers of instances of the event within multiple geographical regions, and the method including aggregating instances of the event in each of the plurality of respective geographical regions based on their associated mini-session geographic location values.

5. The method of claim 1, further comprising:
   generating a series of sub-queries based on the received request and one or more of: a timeframe of query submission, a geographic location of query submission, and a language of query submission, wherein the instances of occurrence of the user-identified event correspond to instances of the sub-queries within the database of events.

6. The method of claim 1, wherein the result includes sub-results, comprising representative statistics of occurrence of the user-identified event, for each of said plurality of time periods.

7. The method of claim 1, wherein the result includes sub-results, comprising representative statistics of occurrence of the user-identified event, for each of said plurality of time periods and each of said plurality of geographic locations.

8. The method of claim 1, wherein the user identified-event comprises submission of search engine queries identified in accordance with the request.

9. A server system for generating user requested statistics, comprising:
   memory;
   one or more processors;
   one or more programs stored in the memory and configured for execution by the one or more processors, the one or more programs including:
   instructions for responding to a request from a client system for statistics of occurrence of a user-identified event, the responding including:
   instructions for accessing a database of events;
   instructions for identifying instances of occurrence of the user-identified event in at least a subset of the database of events to produce representative statistics of occurrence of the user-identified event within the entire database of events;

instructions for generating a result including at least a portion of the representative statistics of occurrence of the user-identified event, the result including sub-results comprising at least representative statistics of occurrence of the user-identified event during each of a plurality of time periods, representative statistics of occurrence of the user-identified event in each of a plurality of geographic locations or representative statistics of occurrence of the user-identified event with respect to each of a plurality of languages; and instructions for sending to the client system for display at the client system the result, including the sub-results;

wherein the sub-results comprise normalized representative statistics of occurrence of the user-identified event that indicate differences in popularity of the user-identified event during the plurality of time periods, differences in popularity of the user-identified event in the a plurality of geographic locations and/or differences in popularity of the user-identified event with respect to the plurality of languages.

10. The system of claim 9, wherein an event in the database of events includes one or more mini-sessions, each mini-session having a user identifier, a temporal value, a geographic location value, and one or more query strings.

11. The system of claim 10, wherein the representative statistics of occurrence of the user-identified event includes numbers of instances of the event within multiple time periods, the one or more programs including instructions for aggregating instances of the event in each of the plurality of respective time periods based on their associated mini-session temporal values.

12. The system of claim 10, wherein the representative statistics of occurrence of the user-identified event includes numbers of instances of the event within multiple geographical regions, the one or more programs including instructions for aggregating instances of the event in each of the plurality of respective geographical regions based on their associated mini-session geographic location values.

13. The system of claim 9, the one or more programs including:

instructions for generating a series of sub-queries based on the received request and one or more of: a timeframe of query submission, a geographic location of query submission, and a language of query submission, wherein the instances of occurrence of the user-identified event correspond to instances of the sub-queries within the database of events.

14. The system of claim 9, wherein the result includes sub-results, comprising representative statistics of occurrence of the user-identified event, for each of said plurality of time periods.

15. The system of claim 9, wherein the result includes sub-results, comprising representative statistics of occurrence of the user-identified event, for each of said plurality of time periods and each of said plurality of geographic locations.

16. The system of claim 9, wherein the user identified-event comprises submission of search engine queries identified in accordance with the request.

17. A non-transitory computer readable storage medium storing one or more programs for execution by one or more processors of a server computer system, the one or more programs comprising:

instructions for responding to a request from a client system for statistics of occurrence of a user-identified event, the responding including:

instructions for accessing a database of events;

instructions for identifying instances of occurrence of the user-identified event in at least a subset of the database of events to produce representative statistics of occurrence of the user-identified event within the entire database of events;

instructions for generating a result including at least a portion of the representative statistics of occurrence of the user-identified event, the result including sub-results comprising at least representative statistics of occurrence of the user-identified event, during each of a plurality of time periods, representative statistics of occurrence of the user-identified event in each of a plurality of geographic locations or representative statistics of occurrence of the user-identified event with respect to each of a plurality of languages; and instructions for sending to the client system for display at the client system the result, including the sub-results;

wherein the sub-results comprise normalized representative statistics of occurrence of the user-identified event that indicate differences in popularity of the user-identified event during the plurality of time periods, differences in popularity of the user-identified event in the a plurality of geographic locations and/or differences in popularity of the user-identified event with respect to the plurality of languages.

18. The non-transitory computer readable storage medium of claim 17, wherein an event in the database of events includes one or more mini-sessions, each mini-session having a user identifier, a temporal value, a geographic location value, and one or more query strings.

19. The non-transitory computer readable storage medium of claim 18, wherein the representative statistics of occurrence of the user-identified event includes numbers of instances of the event within multiple time periods, the one or more programs including instructions for aggregating instances of the event in each of the plurality of respective time periods based on their associated mini-session temporal values.

20. The non-transitory computer readable storage medium of claim 18, wherein the representative statistics of occurrence of the user-identified event includes numbers of instances of the event within multiple geographical regions, the one or more programs including instructions for aggregating instances of the event in each of the plurality of respective geographical regions based on their associated mini-session geographic location values.

21. The non-transitory computer readable storage medium of claim 17, the one or more programs including:

instructions for generating a series of sub-queries based on the received request and one or more of: a timeframe of query submission, a geographic location of query submission, and a language of query submission, wherein the instances of occurrence of the user-identified event correspond to instances of the sub-queries within the database of events.

22. The non-transitory computer readable storage medium of claim 17, wherein the result includes sub-results, comprising representative statistics of occurrence of the user-identified event, for each of said plurality of time periods.

23. The non-transitory computer readable storage medium of claim 17, wherein the result includes sub-results, comprising representative statistics of occurrence of the user-identified event, for each of said plurality of time periods and each of said plurality of geographic locations.

24. The non-transitory computer readable storage medium of claim 17, wherein the user identified-event comprises submission of search engine queries identified in accordance with the request.

* * * * *